US012686080B2

(12) United States Patent
Yamamoto et al.

(10) Patent No.: US 12,686,080 B2
(45) Date of Patent: Jul. 21, 2026

(54) LASER WELDING DEVICE AND LASER WELDING METHOD WITH IMPROVED FILLET FORMATION

(71) Applicant: DELTA KOGYO CO., LTD., Hiroshima (JP)

(72) Inventors: Yukio Yamamoto, Hiroshima (JP); Tomohito Tsudo, Hiroshima (JP); Masashi Hiraoka, Hiroshima (JP); Seiya Takahashi, Hiroshima (JP)

(73) Assignee: DELTA KOGYO CO., LTD., Hiroshima (JP)

( * ) Notice: Subject to any disclaimer, the term of this patent is extended or adjusted under 35 U.S.C. 154(b) by 999 days.

(21) Appl. No.: 17/759,914

(22) PCT Filed: Feb. 8, 2021

(86) PCT No.: PCT/JP2021/004667
§ 371 (c)(1),
(2) Date: Aug. 1, 2022

(87) PCT Pub. No.: WO2021/171992
PCT Pub. Date: Sep. 2, 2021

(65) Prior Publication Data
US 2023/0068401 A1 Mar. 2, 2023

(30) Foreign Application Priority Data
Feb. 25, 2020 (JP) ................................. 2020-029809

(51) Int. Cl.
B23K 26/21 (2014.01)
(52) U.S. Cl.
CPC ................................... *B23K 26/21* (2015.10)

(58) Field of Classification Search
CPC ........ B23K 26/21; B23K 26/22; B23K 26/32; B23K 26/082; B23K 33/008; B23K 2101/006; B23K 2101/18
See application file for complete search history.

(56) References Cited

U.S. PATENT DOCUMENTS 10,549,388 B2 2/2020 Fujimoto et al.
2005/0246894 A1 11/2005 Lundgren
(Continued)

FOREIGN PATENT DOCUMENTS

CN 110355471 A 10/2019
EP 3112076 A1 1/2017
(Continued)

OTHER PUBLICATIONS

An Office Action; mailed by the China National Intellectual Property Administration of the People's Republic of China on Dec. 27, 2024, which corresponds to Chinese Patent Application No. 202180012407.4 and is related to U.S. Appl. No. 17/759,914; with English summary.
(Continued)

*Primary Examiner* — Steven W Crabb
(74) *Attorney, Agent, or Firm* — Studebaker Brackett PLLC

(57) ABSTRACT

A laser welding method is a method for joining a first member in the shape of a plate and made of a metal material to a second member made of a metal material by laser welding. The laser welding method includes an arranging step and a laser beam irradiation step. In the arranging step, the second member is brought into contact with or brought close to one main surface of the first member. In the laser beam irradiation step, the other main surface of the first member is irradiated with the laser beam, the other surface being a main surface opposite to the one main surface of the first member. In the laser beam irradiation step, the first (Continued)

member and the second member are melted to form a weld portion having a substantially circular or oval shape in a plan view and to form a fillet on a joined portion between the first member and the second member.

14 Claims, 25 Drawing Sheets

(56) References Cited

U.S. PATENT DOCUMENTS

| | | | |
|---|---|---|---|
| 2011/0020666 A1* | 1/2011 | Wakisaka | B23K 1/19 |
| | | | 428/650 |
| 2014/0144024 A1* | 5/2014 | Byrne, II | B23K 28/02 |
| | | | 219/121.64 |
| 2015/0174702 A1 | 6/2015 | Fujimoto et al. | |
| 2016/0332257 A1* | 11/2016 | Kawamoto | B23K 26/082 |
| 2017/0008124 A1 | 1/2017 | Fujimoto et al. | |
| 2017/0050269 A1 | 2/2017 | Nakagawa et al. | |
| 2017/0232553 A1 | 8/2017 | Sievi et al. | |
| 2018/0117707 A1* | 5/2018 | Fujiwara | B23K 26/322 |
| 2018/0126491 A1* | 5/2018 | Nakagawa | B23K 26/0626 |
| 2019/0061056 A1* | 2/2019 | Yang | B23K 26/322 |
| 2019/0308271 A1 | 10/2019 | Hioki et al. | |
| 2021/0060701 A1* | 3/2021 | Markushov | B23K 26/242 |
| 2022/0088709 A1* | 3/2022 | Wang | B23K 26/244 |

FOREIGN PATENT DOCUMENTS

| | | | |
|---|---|---|---|
| JP | 2005-021912 A | | 1/2005 |
| JP | 3907373 B2 | | 4/2007 |
| JP | 3935639 B2 | | 6/2007 |
| JP | 5239366 B2 | * | 7/2013 |
| JP | 5656220 B2 | | 1/2015 |
| JP | 2019-069784 A | | 5/2019 |
| WO | 2004/016911 A1 | | 2/2004 |
| WO | 2015/104762 A1 | | 7/2015 |
| WO | 2015/129231 A1 | | 9/2015 |
| WO | 2016/189855 A1 | | 12/2016 |

OTHER PUBLICATIONS

International Search Report issued in PCT/JP2021/004667; mailed Apr. 20, 2021.

Communication pursuant to Article 94(3) EPC issued by the European Patent Office on May 22, 2024, which corresponds to European Patent Application No. 21759805.1 and is related to U.S. Appl. No. 17/759,914.

The extended European search report issued by the European Patent Office on Dec. 23, 2022, which corresponds to European Patent Application No. 21759805.1-1103 and is related to U.S. Appl. No. 17/759,914.

* cited by examiner 545    546

LASER WELDING DEVICE AND LASER WELDING METHOD WITH IMPROVED FILLET FORMATION

TECHNICAL FIELD

The present invention relates to a laser welding method and a laser welding device.

BACKGROUND ART

A laser welding technology may be used to join metal members together. With laser welding, a part of metal members to be joined is melted by a laser beam and solidified to join together. Usage of laser welding has advantages over resistance welding or the like, such as faster welding and less thermal effects.

Patent Literature 1 discloses a laser welding method according to which two metal plates are perpendicularly butted against each other and a laser beam is applied along the butted part to weld the part and form a T-shaped or H-shaped steel. According to the method disclosed in Patent Literature 1, welding is performed by simultaneously applying two laser beams from both surface sides of the butted metal plates onto positions counter to each other while moving irradiation points in the same direction.

Patent Literature 2 discloses a method for fabricating a welded H-shaped steel according to which single-pass welding is performed by simultaneously applying a laser beam from one surface side of a web member onto two T-shaped joints at both ends of the web member where flange members are press-fitted to the web member. According to the method disclosed in Patent Literature 2, laser welding is performed in a state where the flange member to be welded is held at an angle with the web member on the laser beam irradiation side being smaller than an angle with the web member on the other side of the laser beam irradiation side.

Patent Literature 3 discloses a method for laser welding an upper rail of a slider to a coupling bracket in a vehicle seat manufacturing process. According to the method disclosed in Patent Literature 3, a lower surface of the coupling bracket, the lower surface having an L-shaped section, is superposed on an upper surface of a part of the upper rail having a U-shaped section, and both sides of the superposed part are irradiated with a laser beam.

Patent Literature 4 discloses a method in combination of arc welding and laser welding, for performing fillet welding on a T-shaped joint and a lap joint of a structure.

Patent Literature 5 discloses a device that laser-welds a round metal rod to a foil-like metal plate disposed parallel with the center line of the metal rod. According to a technology disclosed in Patent Literature 5, the metal rod is disposed at a given position on the metal plate placed on a flat plate surface, and is kept pressed to the metal plate by a bifurcated recess of an inverted Y-shaped optical unit. In this state, a laser beam coming from an upper part of the optical unit is led into bifurcated branch paths in the form of two branches of beams, which are then condensed by condenser lenses set at the ends of the bifurcated branch paths, and laser beams are applied from both sides such that a light-condensing spot is formed near a part where the metal rod and the metal plate are in contact with each other.

CITATION LIST

Patent Literature

Patent Literature 1: Japanese Patent Application Laid-Open No. 2005-21912

Patent Literature 2: Japanese Patent No. 5656220
Patent Literature 3: Japanese Patent Application Laid-Open No. 2019-69784
Patent Literature 4: Japanese Patent No. 3907373
Patent Literature 5: Japanese Patent No. 3935639

SUMMARY OF INVENTION

The background arts, however, have the following problems (i) to (ix).

(i) According to the background art, a spot diameter and a melting area of a laser beam is narrow, which requires the laser beam to focus exactly onto a welding spot. Because a little margin of error in laser irradiation is allowed, a slight positional misalignment of the laser beam or a member to be welded makes correct welding impossible.

(ii) According to the background art, low precision of a groove for butting members-to-be-welded against each other creates a work gap. This leads to a case where a laser beam with a small spot diameter passes through an irradiation spot or a case where improper welding causes burn-through, an insufficient penetration, or an undercut, which result in significant drop of fatigue strength. In order to avoid these cases, improvement of the groove butting precision is required, which invites a significant cost increase.

(iii) According to the background art, when a plurality of members superposed together are welded, the members to be welded have a large thickness as a whole; to achieve a sufficient penetration depth, a laser beam having higher energy density is needed. In such a case, low-speed scanning is likely to cause burn-through or porosity, while high-speed scanning causes spattering and easily form underfilling or humping. Therefore control is difficult. In addition, when errors in precision of individual members add up when the member are stacked together and respective welded spots of the members do not properly come in contact with each other, there may be a case of a failure in welding or insufficient welding strength.

(iv) In a case where members are joined together by laser welding, the amount of angular deformation (distortion) turned out to be smaller than that in a case where the member are joined by arc welding. Nevertheless, in this case, angular deformation (distortion) needs to be prevented or reworked, as prevented or reworked by the background art disclosed in Patent Literature 2.

(v) According to the background art, depending on a shape to be welded, an irradiation direction and an irradiation area of a laser beam are limited and only a part can be welded, therefore sufficient strength cannot be achieved. For example, when the outer peripheral surface of a pipe is brought into contact with or brought close to a main surface of a plate and is welded thereto, a part where both members are in contact with each other is only welded linearly, so that the welding line does not have a sufficient strength.

(vi) According to the background art, a fillet is formed small or is hardly formed on a part irradiated with a laser beam. To form a fillet, it is necessary to take measures such as combining laser welding with arc welding as seen in the background art disclosed in Patent Literature 4, adding a filler metal such as a filler member, or adding an extra shape for fillet formation to the member.

(vii) According to the background art, when welding is performed in succession, heat input increases at the latter half of the welding process. When output of the laser beam is constant, a scanning speed drops at an end part, where heat input increases as a consequence, thus making burn-through control difficult.

(viii) According to the background art, forming a fillet shape on both sides of a T-shaped joint or the like requires performing laser irradiation multiple times or using a plurality of laser heads. This leads to an increase in processes or equipment cost. It also invites a case where extra equipment, such as an arc welding machine, becomes necessary, in addition to a laser welding machine.

(ix) According to the background art, when laser welding needs to be performed on a complicated shape or a narrow part where the head of a laser welding device or a laser beam cannot reach, such problems arise that a dedicated laser welding device is required, a structure needs to be changed so that the laser beam can be applied to such a shape or part, and a plurality of processes need to be carried out.

The present invention has been made in view of the above problems, and an object of the present invention is to provide a laser welding method and a laser welding device that when welding metal members of various shapes to a metal plate, can form a fillet with a high positional tolerance and without adding a filler metal even in a complicated joining form, and can weld the metal members with high strength at high productivity.

A laser welding method according to one aspect of the present invention is a laser welding method for joining a first member in the shape of a plate and made of a metal material to a second member made of a metal material by laser welding. The laser welding method includes: an arranging step of bringing the second member into contact with or close to one main surface of the first member; and a laser beam irradiation step of irradiating a laser beam to the other main surface of the first member, the other main surface being a main surface opposite to the one main surface of the first member which the second member is brought into contact with or brought close to. In the laser beam irradiation step, the first member and the second member are melted to form a weld portion having a substantially circular or oval shape in a plan view and to form a fillet on a joined portion between the first member and the second member.

BRIEF DESCRIPTION OF DRAWINGS

FIG. 17 is a perspective view (partial cross-sectional view) showing a weld portion formed by a laser welding method according to an eighteenth embodiment of the present invention;

DESCRIPTION OF EMBODIMENTS

Embodiments of the present invention will hereinafter be described with reference to the drawings. The embodiments to be described below are examples of the present invention. The present invention is not limited by the following embodiments except for an essential configuration thereof.

First Embodiment

1. Outline of Configuration of Laser Welding Device 1

Figure 1:
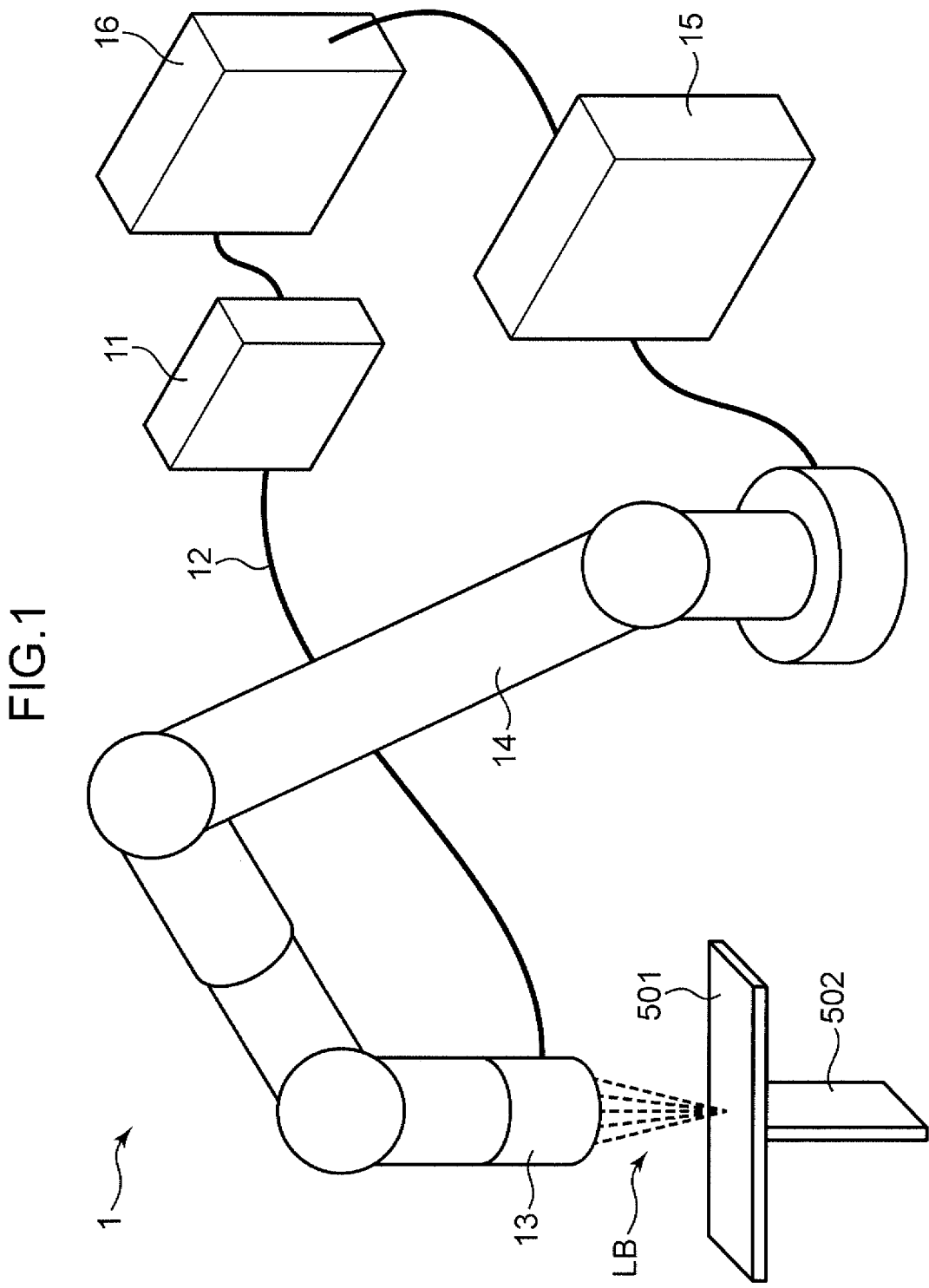
FIG. 1 is a schematic diagram showing a configuration of a laser welding device according to a first embodiment.

FIG. 1 is a schematic diagram showing a configuration of a laser welding device 1 according to a first embodiment.

As shown in FIG. 1, the laser welding device 1 includes a laser oscillator 11, an optical path 12, and a light-condensing unit 13. The laser oscillator 11 generates a laser beam LB according to commands from a controller (control unit) 16 connected to the laser oscillator 11.

The laser beam LB generated by the laser oscillator 11 is transmitted through the optical path 12 onto the light-condensing unit 13. In the light-condensing unit 13, the transmitted laser beam LB is condensed to an upper surface of a metal plate (first member) 501 (to form a spot). The light-condensing unit 13 has a function of condensing the laser beam LB (function as a light-condensing unit) and a function of scanning the spot of the laser beam LB on the upper surface of the metal plate 501 (function as a scanning unit) as well. The orbital scanning of the laser beam LB is also carried out in accordance with an instruction from the controller 16.

The controller 16 includes a microprocessor including a CPU, a RAM, a ROM, and the like, and a peripheral circuit.

In the laser welding device 1 according to this embodiment, an optical fiber cable is used as an example of the optical path 12. Various types of routes different from the optical fiber cable, however, may also be adopted as optical paths capable of transmitting the laser beam LB. In this embodiment, for example, the metal plate 501 and a metal plate (second member) 502 are joined together to form a T-shaped joint.

The laser welding device 1 includes a welding robot 14, and a driver 15 that drives the welding robot 14. The welding robot 14 has the light-condensing unit 13 attached to its front end, and moves the light-condensing unit 13 three-dimensionally according to an instruction from the controller 16 connected to the driver 15.

2. Outline of Laser Welding Method

Figure 2A:
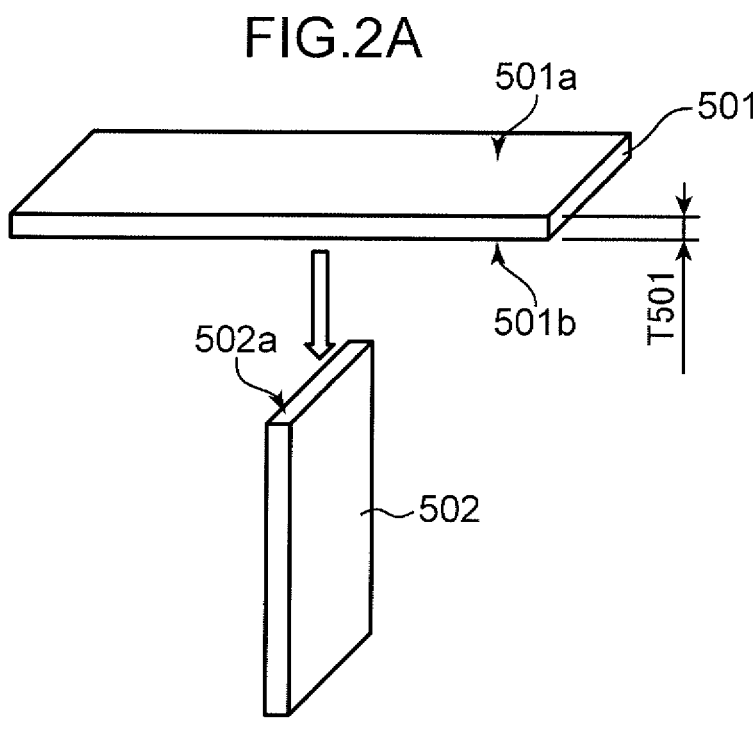
FIG. 2A is a perspective view for explaining a method for joining plate members together by laser welding, showing an arranging step of arranging metal plates into a state of being abutted against each other.
Figure 2B:
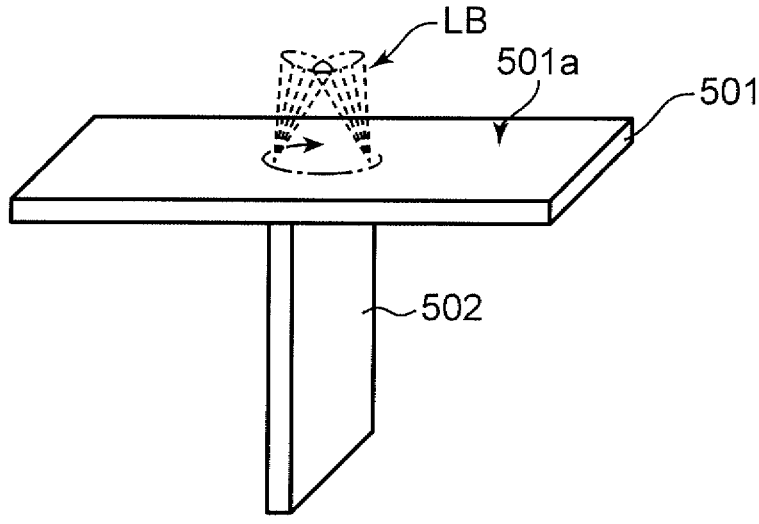
FIG. 2B is a perspective view for explaining a method for joining plate members together by laser welding, showing a laser beam irradiation step of irradiating a laser beam to an upper surface of a metal plate.
Figure 3:
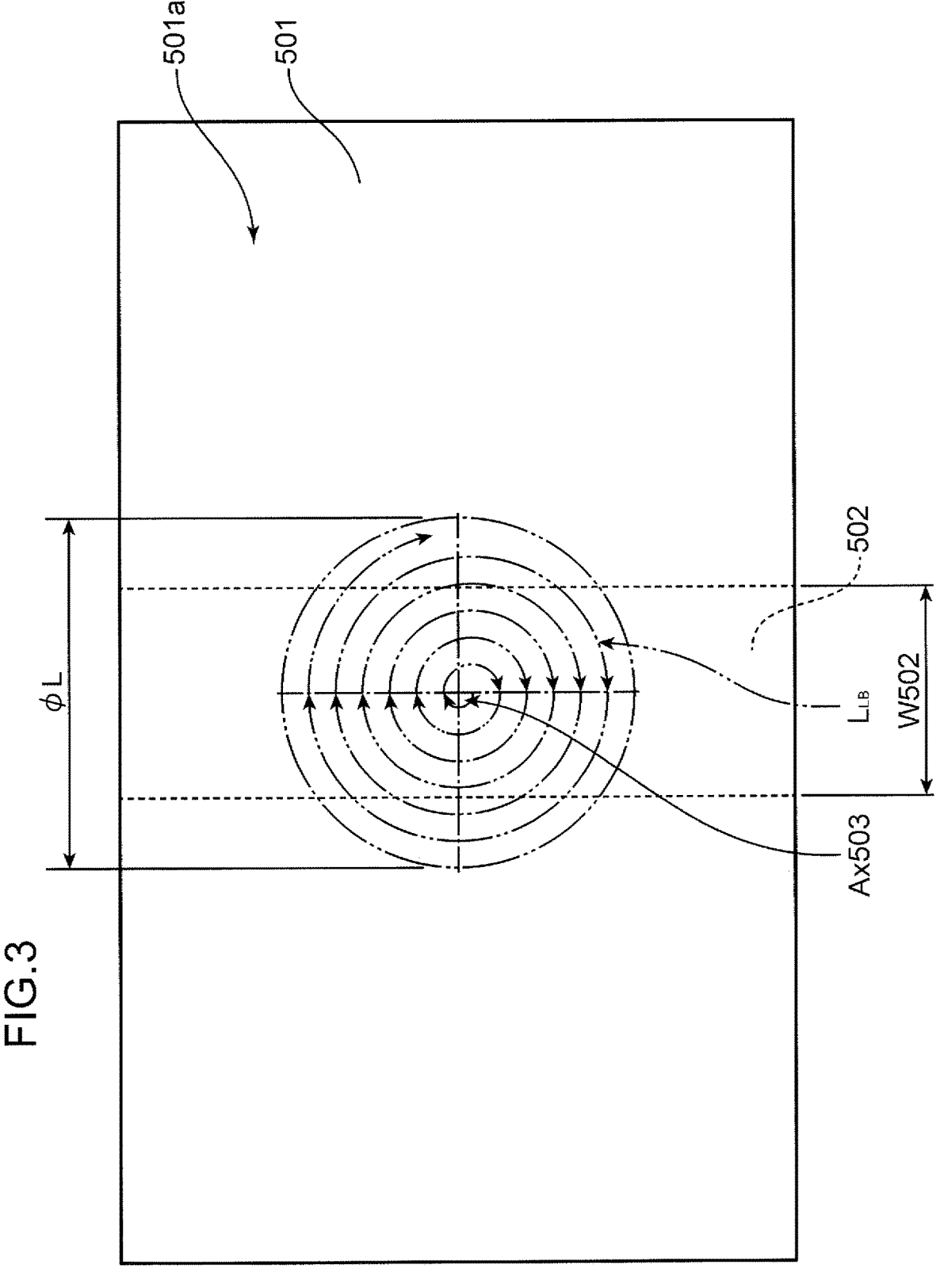
FIG. 3 is a plan view showing a scanning track of a spot of a laser beam, the scanning trajectory being formed during laser welding.

FIG. 2A is a perspective view for explaining a method for joining plate members together by laser welding, showing an arranging step of arranging the metal plate 501 and the metal plate 502 into a state in which an end face 502a of the metal plate 502 is butted against a lower surface 501b of the metal plate 501, and FIG. 2B is a perspective view for explaining a method for joining plate members together by laser welding, showing a laser beam irradiation step of irradiating the laser beam LB to the upper surface 501a of the metal plate 501. FIG. 3 is a plan view showing a scanning track $L_{LB}$ of a spot of the laser beam LB, the scanning track $L_{LB}$ being formed during laser welding.

(1) Arranging Step

First, the metal plate 501, which is a first member, and the metal plate 502, which is a second member, are prepared. The metal plate 501 has a thickness T501.

As shown in FIG. 2A, the end face 502a of the metal plate 502 is butted against the lower surface 501b of the metal plate 501. At this time, a slight gap may be left between the lower surface 501b of the metal plate 501 and the end face 502a of the metal plate 502. In other words, the end face 502a of the metal plate 502 may be brought close to the lower surface 501b of the metal plate 501.

(2) Laser Beam Irradiation Step

As shown in FIG. 2B, a given area of the upper surface 501a of the metal plate 501 is irradiated with the laser beam LB while the end face 502a of metal plate 502 is kept butted against the lower surface 501b of metal plate 501. The laser beam LB is irradiated such that spots of the laser beam LB are orbitally formed around a given part, as indicated by an arrow in FIG. 2B. Specifically, as shown in FIG. 3, the spots of the laser beam LB are orbitally formed around a part Ax503 on the upper surface 501a of the metal plate 501, the part Ax503 being an orbital center until reaching a circle, to form the scanning trajectory $L_{LB}$ of a spiral shape.

As shown in FIG. 3, an area (given area) to be irradiated with the laser beam LB is a part of the upper surface 501a of the metal plate 501 and a peripheral area of the part, the part being opposite to an area where the end face 502a of the metal plate 502 is in contact with the lower surface 501b of metal plate 501, that is, being opposite to the area across the thickness T501 of the metal plate 501. The outer diameter $\phi L$ of the area of the spots on the circle orbitally scanned by the laser beam LB is equal to or larger than the outer diameter of an area W502 equivalent to the thickness of the metal plate 502.

In this manner, by determining the outer diameter $\phi L$ to be equal to or larger than the outer diameter of the area W502, that is, to be equal to or larger than the thickness of the metal plate 502, a part where the metal plate 501 and the metal plate 502 are joined together can be melted. When a T-shaped joint is to be formed as in the case of this embodiment, a fillet can be formed on a stress concentration part of the joint, which allows the metal plate 501 and the metal plate 502 to be joined with high strength.

3. Form of Weld Portion 503

Figure 4:
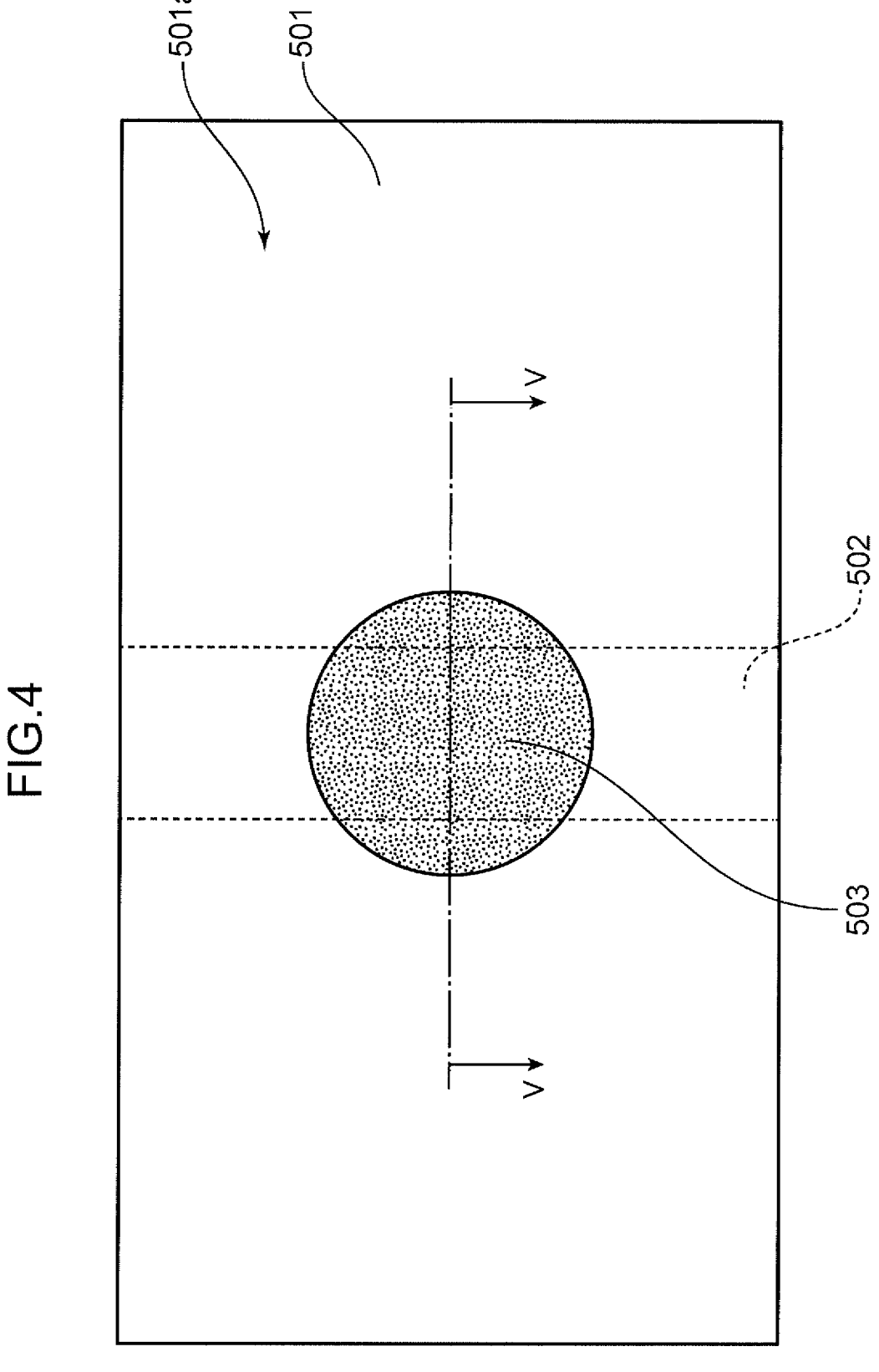
FIG. 4 is a plan view showing a weld portion.
Figure 5:
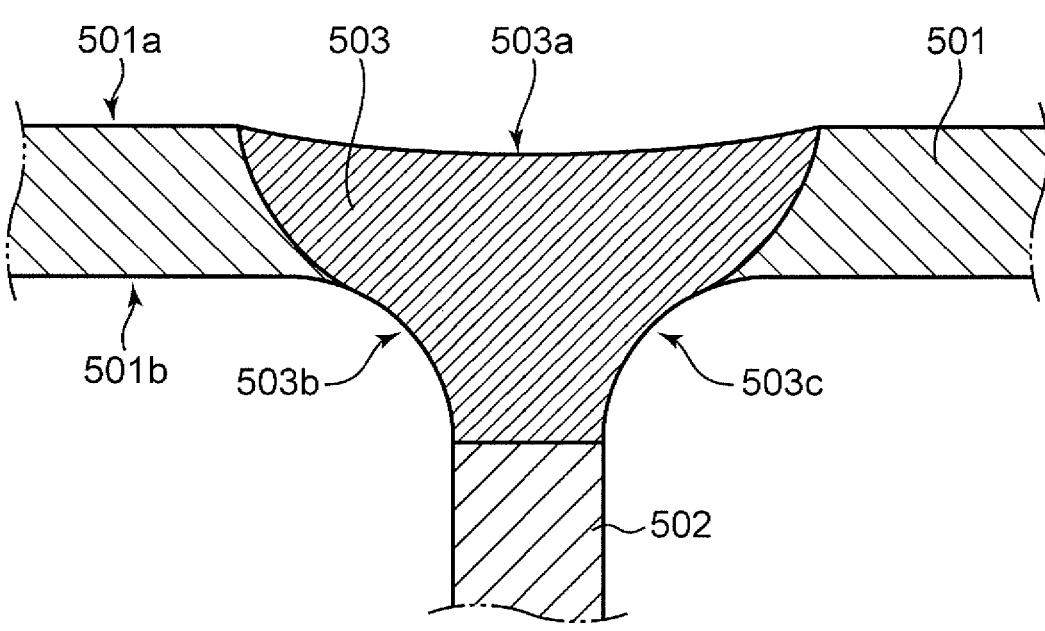
FIG. 5 is a cross-sectional view taken along a line V-V in FIG. 4.

FIG. 4 is a plan view of a weld portion 503 formed by welding using the laser welding device 1, and FIG. 5 is a cross-sectional view taken along a line V-V in FIG. 4.

As shown in FIG. 4, when the metal plate 501 and the metal plate 502 are joined using the laser welding device 1 according to this embodiment, the weld portion 503 having a substantially circular shape in plan view is formed. The shape of the weld portion in plan view, however, is not limited to a substantially circular shape, and may be an oval shape.

As shown in FIG. 5, a cross-sectional view of the metal plates 501 and 502 and the weld portion 503 demonstrates that an upper surface 503*a* of the weld portion 503 having a substantially circular shape in a plan view, the upper surface 503*a* being part of the upper surface 501*a* of the metal plate 501, is slightly recessed from the upper surface 501*a* of the metal plate 501 that surrounds the upper surface 503*a*.

The weld portion 503 having a substantially circular shape in plan view has fillets 503*b* and 503*c* formed on a part that is on the lower surface 501*b* of the metal plate 501 and that is close to a butted portion of the metal plate 502. The fillets 503*b* and 503*c* are formed without supplying a filler metal, such as a wire, to both sides of the butted portion because a molten metal flows into the both sides as a result of an orbital of the spots of the laser beam LB in the welding process, as shown in FIG. 2B. Hence, by the laser welding method according to this embodiment, the metal plate 501 and the metal plate 502 can be joined with high strength.

4. Setting Position of Orbital Center Ax503 of Spots of Laser Beam LB

Figure 6A:
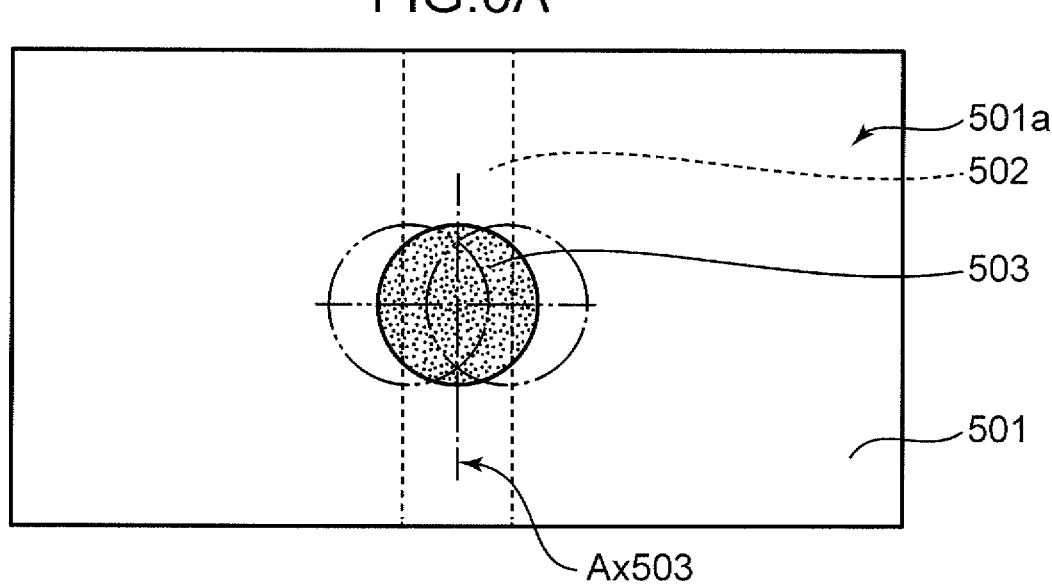
FIG. 6A is a plan view showing a positional relationship between a butted portion of a metal plate and an orbital center of a spot of a laser beam.
Figure 6B:
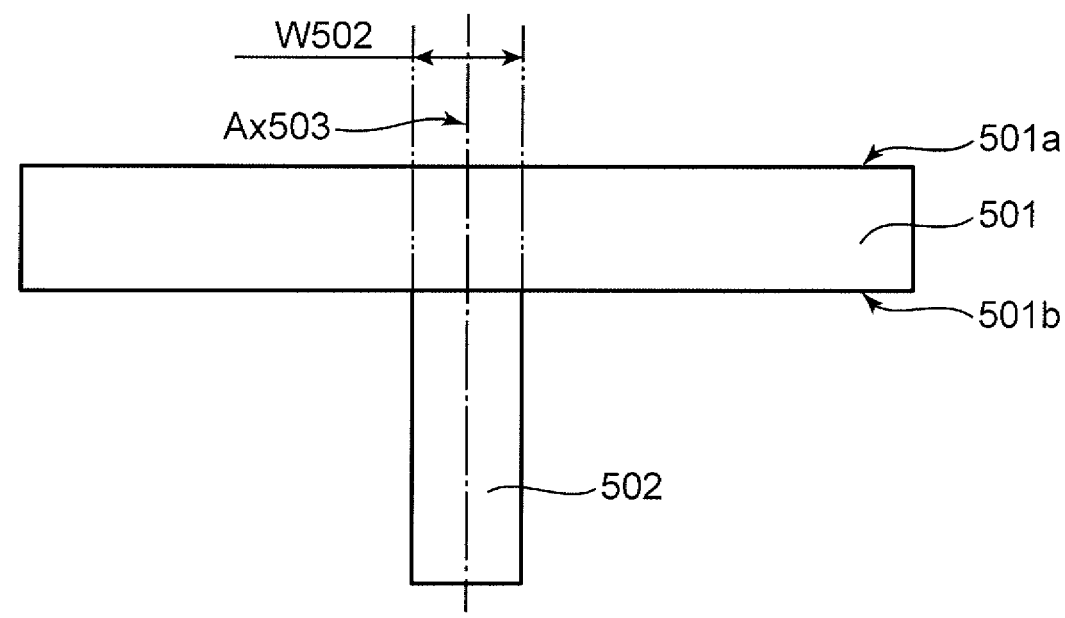
FIG. 6B is a front view showing a positional relationship between the butted portion of the metal plate and the orbital center of a spot of the laser beam.

FIG. 6A is a plan view showing a positional relationship between the butted portion of the metal plates 501 and 502 and the orbital center Ax503 of the spots of the laser beam LB, and FIG. 6B is a plan view showing a positional relationship between the butted portion of the metal plates 501 and 502 and the orbital center Ax503 of the spots of the laser beam LB.

As shown in FIG. 6B, by the laser welding according to this embodiment, the end face 502*a* of the metal plate 502 is butted against the lower surface 501*b* of the metal plate 501 to bring the end face 502*a* into contact with the lower surface 501*b* (see FIG. 2A). The butted portion of the metal plate 501 and the metal plate 502 thus corresponds to the area W502 equivalent to the thickness of the metal plate 502.

By the laser welding according to this embodiment, the orbital center Ax503 of the spots of the laser beam LB is set in a area equivalent to the area W502 on the upper surface 501*a* of the metal plate 501. As a result, the weld portion 503 having a substantially circular shape in plan view, the weld portion 503 having a center in the area W502 on the upper surface 501*a* of the metal plate 501, is formed, as shown in FIG. 6A.

As described above, by setting the orbital scan center Ax503, the fillets 503*b* and 503*c* can be formed at both sides of the butted portion of the lower surface 501*b* of the metal plate 501 and the end face 502*a* of the metal plate 502 without supplying the filler metal or processing a peripheral part of the weld portion in advance. This is advantageous in joining the metal plate 501 and the metal plate 502 with high strength.

In addition, laser-melting both members 501 and 502 to be joined forms the fillets 503*b* and 503*c* on corners of the joined portion due to the effect of the gravity and surface tension, which further increases welding strength.

Second Embodiment

Figure 7:
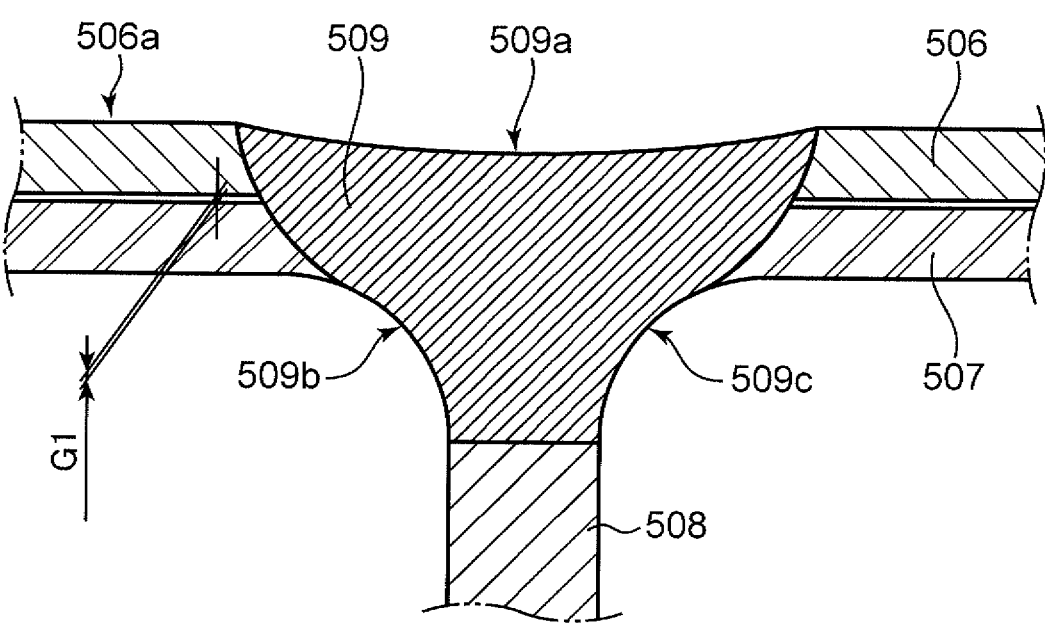
FIG. 7 is a cross-sectional view showing a weld portion formed by a laser welding method according to a second embodiment.

FIG. 7 is a cross-sectional view showing a weld portion 509 having a substantially circular shape in a plan view, the weld portion 509 being formed by a laser welding method according to a second embodiment.

In this embodiment, a laser welding device that is basically the same in configuration as the laser welding device 1 of the first embodiment is used. The second embodiment is different from the first embodiment in that three metal plates 506 to 508 are to be joined.

According to the laser welding method of this embodiment, in the arranging step, the metal plate 506 and the metal plate 507 are superposed together, and an end face of the metal plate 508 is brought into contact with or close to a lower surface of the metal plate 507, as shown in FIG. 7. In this embodiment, a small gap G1 is left between the metal plate 506 and the metal plate 507. The gap G1 between the metal plate 506 and the metal plate 507 is, however, not always required.

By the laser welding method according to this embodiment, an upper surface 506*a* of the metal plate 506 is irradiated with the laser beam LB from above the metal plate 506 to form the weld portion 509 having a substantially circular shape in plan view. As a result, the metal plate 506, the metal plate 507, and the metal plate 508 are joined together.

In this embodiment, in the laser beam irradiation step, the laser beam LB is orbitally scanned around a given part in a scanning movement to form the weld portion 509 having a substantially circular or oval shape in plan view and form the fillets 509*b* and 509*c* as well in the same manner as in the first embodiment. As shown in FIG. 7, an upper surface 509*a* of the weld portion 509 having a substantially circular shape in plan view is slightly recessed relative to the upper surface 506*a* of the metal plate 506.

According to the laser welding method of this embodiment, metal plates including two metal plates 506 and 507 superposed together are welded, and the metal plates can be joined with high strength in the same manner as in the first embodiment.

According to the background art disclosed in Patent Literature 2, a laser beam is applied onto an upper surface of a metal plate, and the laser beam LB makes a weaving movement (zigzag, curved, wave-like, or spiral scanning movement) on the upper surface. In a case where such a method is adopted, arrangement patterns of metal members that allow welding are limited, and sufficient joining strength may not be achieved in some cases, depending on arrangement patterns.

As described in (iii) above, according to the background art, when a plurality of metal plates superposed together are welded to another metal plate, as shown in FIG. 7, a problem arises that precision errors of individual metal plates, even if they are within a tolerance, amount to a positional misalignment, and consequently a target positional tolerance turns out to be low.

In addition, when a joint of a shape shown in FIG. 7 is to be formed, a precise groove for butting is required and a work gap tolerance is kept smaller than 0.2. In such a case, a shear surface or a fracture surface that results from press working affects joining strength.

Further, the presence of a work gap poses a problem that an undercut is formed or a problem that a joint including a stack of metal plates cannot be formed.

Adopting the laser welding method according to this embodiment solves the above problems, allowing welding of metal members with a relatively high degree of freedom.

Third Embodiment

Figure 8:
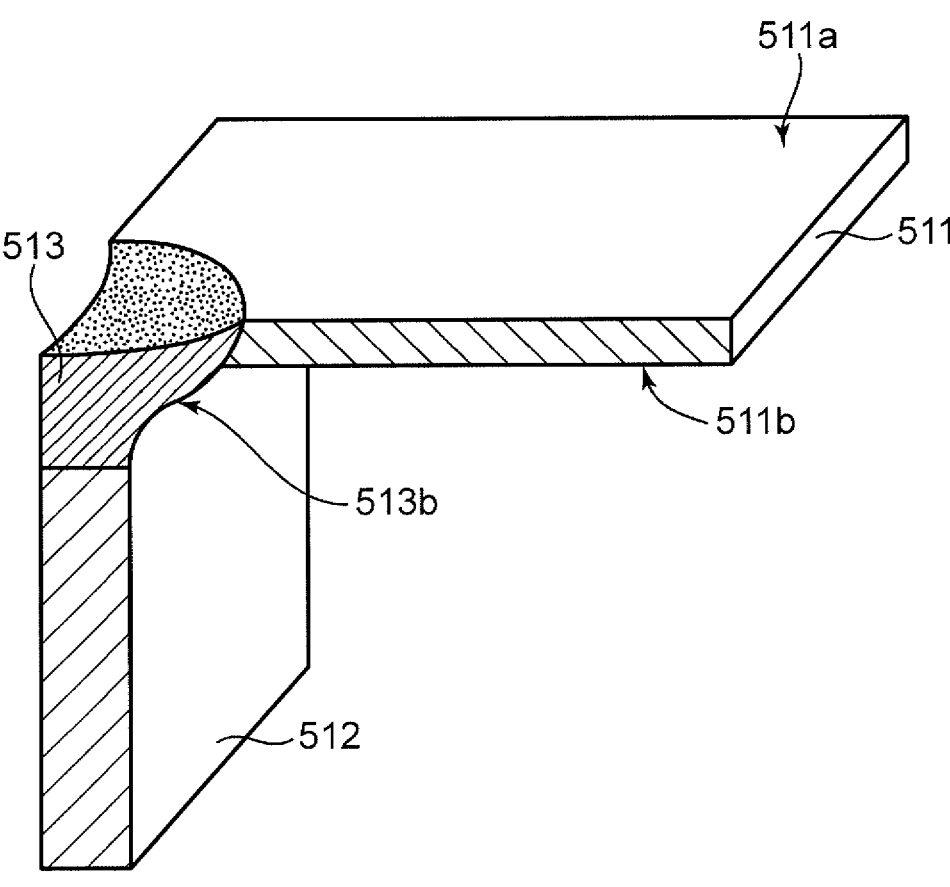
FIG. 8 is a perspective view (partial cross-sectional view) showing a weld portion formed by a laser welding method according to a third embodiment.

FIG. 8 is a perspective view (partial cross-sectional view) showing a weld portion 513 having a substantially semicircular shape in a plan view, the weld portion 513 being formed by a laser welding method according to a third embodiment.

In this embodiment, a laser welding device that is basically the same in configuration as the laser welding device 1 of the first embodiment is used. The third embodiment is different from the first embodiment in a pattern of arrangement of a metal plate 512 relative to a metal plate 511 and in a part where the weld portion 513 is formed.

As shown in FIG. 8, by laser welding according to this embodiment, a corner joint is formed using two metal plates (first member and second member) 511 and 512. Specifically, an end face of the metal plate 512 is brought into contact with or close to an end of a lower surface (one main surface) 511b of the metal plate 511. Subsequently, an upper surface (the other main surface) 511a of the metal plate 511 is irradiated with the laser beam LB. Then, in the same manner as in the first embodiment, the laser beam LB is orbitally scanned around a given part on the upper surface 511a of the metal plate 511. As a result, a weld portion 513 having a substantially semicircular shape in a plan view is formed.

At the same time, a fillet 513b is formed on a butted portion where the metal plate 512 is butted against the lower surface 511b of the metal plate 511.

The definition of the area where the laser beam LB is orbitally scanned is the same as that in the first embodiment. However, in formation of the corner joint, the scanning trajectory is controlled so as not to irradiate the outside of the upper surface 511a of the metal plate 511 with the laser beam LB.

When the corner joint is formed by the above-described laser welding method, the metal plate 511 and the metal plate 512 can be joined with high strength and a high position tolerance in the same manner as in the first embodiment.

Fourth Embodiment

Figure 9:
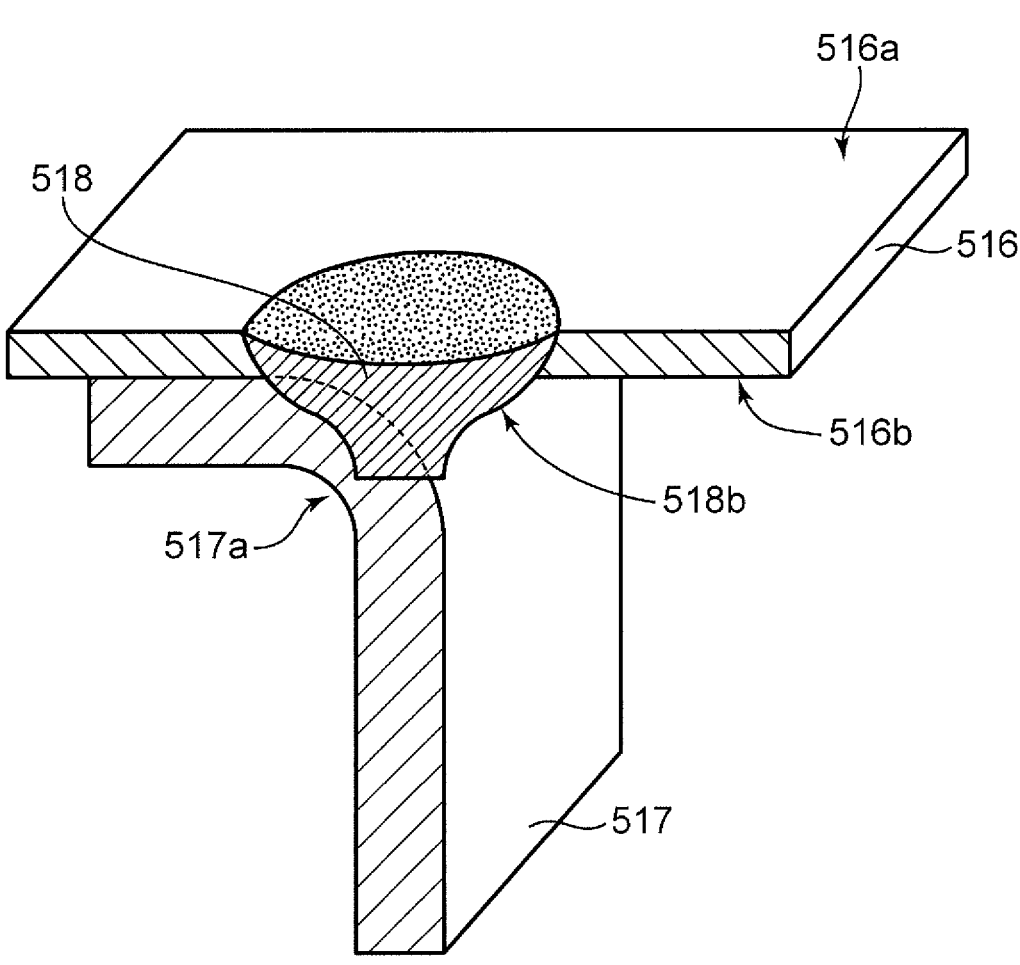
FIG. 9 is a perspective view (partial cross-sectional view) showing a weld portion formed by a laser welding method according to a fourth embodiment.

FIG. 9 is a perspective view (partial cross-sectional view) showing a weld portion 518 having a substantially circular shape in a plan view, the weld portion 518 being formed by a laser welding method according to a fourth embodiment.

In this embodiment, a laser welding device that is basically the same in configuration as the laser welding device 1 of the first embodiment is used. The fourth embodiment is different from the first embodiment in that a metal plate 517 having an L-shaped section is used as the second member.

As shown in FIG. 9, by laser welding according to this embodiment, a flared joint is formed, using two metal plates (first member and second member) 516 and 517. Specifically, a part of the metal plate 517 having the L-shaped section is brought into contact with a lower surface (one main surface) 516b of the metal plate 516. Subsequently, an upper surface (the other main surface) 516a of the metal plate 516 is irradiated with the laser beam LB. In this embodiment, the laser beam LB is orbitally scanned around a given part on the upper surface 516a of the metal plate 516, in the same manner as in the first embodiment. As a result, a weld portion 518 having a substantially circular shape in a plan view is formed.

At the same time, a fillet 518b is formed in a gap near a contact portion where the metal plate 517 is in contact with the lower surface 516b of the metal plate 516.

An area of upper surface 516a to be irradiated with the laser beam LB is a part and its peripheral area, the part being opposite to a bent part 517a of the metal plate 517 across the thickness of the metal plate 516 in a plan view of the upper surface 516a. The definition of the area where the laser beam LB is orbitally scanned is the same as that in the first embodiment.

When a corner joint is formed by the above-described laser welding method, the metal plate 516 and the metal plate 517 can be joined with high strength and a high position tolerance in the same manner as in the first embodiment.

Fifth Embodiment

Figure 10:
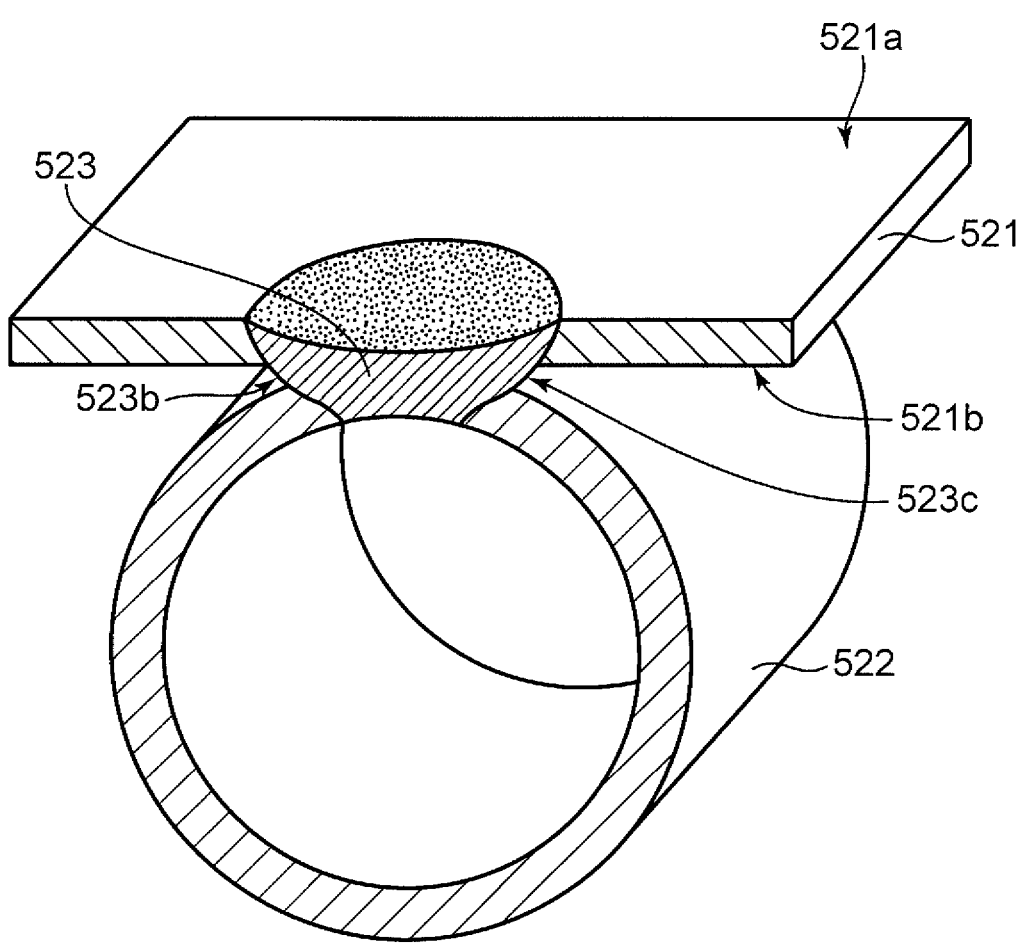
FIG. 10 is a perspective view (partial cross-sectional view) showing a weld portion formed by a laser welding method according to a fifth embodiment.
Figure 11A:
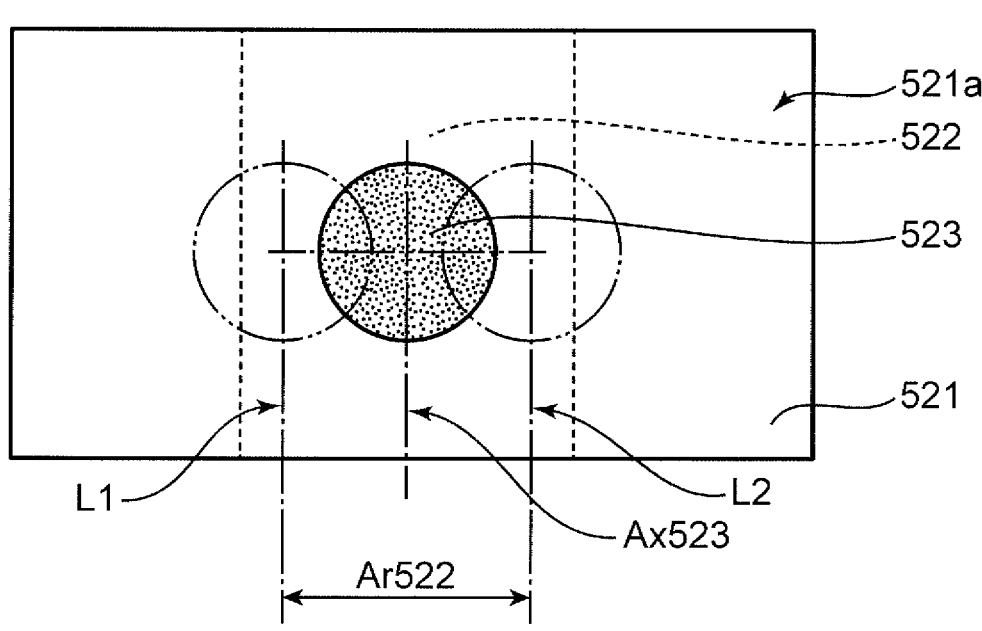
FIG. 11A is a plan view showing a positional relationship between a metal plate, a pipe member, and the center of a weld portion.
Figure 11B:
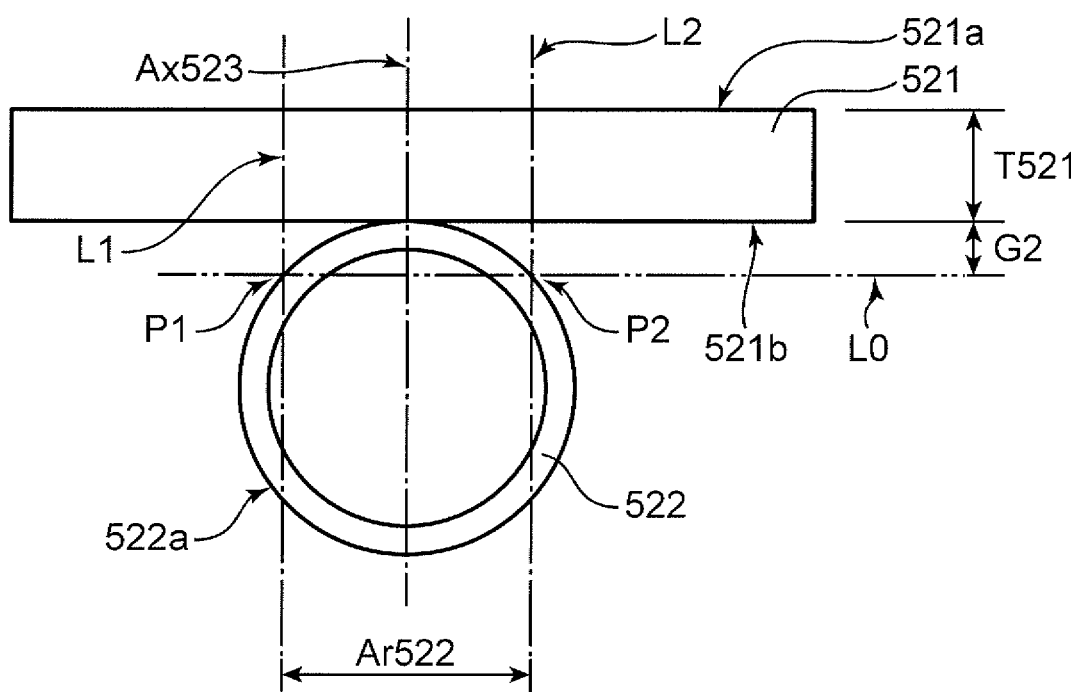
FIG. 11B is a front view showing a positional relationship between the metal plate, the pipe member, and the center of the weld portion.

FIG. 10 is a perspective view (partial cross-sectional view) showing a weld portion 523 having a substantially circular shape in a plan view, the weld portion 523 being formed by a laser welding method according to a fifth embodiment. FIG. 11A is a plan view showing a positional relationship between a metal plate 521, a pipe member 522, and the center Ax523 of the weld portion 523 (the orbital center of the spots of the laser beam LB), and FIG. 11B is a front view showing a positional relationship between the metal plate 521, the pipe member 522, and the center Ax523 of the weld portion 523 (the orbital center of the spots of the laser beam LB).

1. Laser Welding Method

As shown in FIG. 10, by laser welding according to this embodiment, the metal plate (first member 521) and the pipe member 522 are joined together. Specifically, a part of the outer peripheral surface of the pipe member 522 is brought into contact with or close to a lower surface (one main surface) 521b of the metal plate 521. Subsequently, an upper surface (the other main surface) 521a of the metal plate 521 is irradiated with the laser beam LB. In this embodiment, the laser beam LB is orbitally scanned around a given part on the upper surface 521a of the metal plate 521, in the same manner as in the first embodiment. As a result, a weld portion 523 having a substantially circular shape in a plan view is formed.

At the same time, fillets 523b and 523c are formed on both sides of a portion where the pipe member 522 is brought into contact with or close to the lower surface 521b of the metal plate 521.

An area of upper surface 521a to be irradiated with the laser beam LB is a part and its peripheral area, the part being opposite to the portion where the outer peripheral surface of the pipe member 522 is brought into contact with or close to the lower surface 521b, across the thickness of the metal plate 521 in a plan view of the upper surface 521a. The definition of the area where the spot of the laser beam LB makes the circular movement is the same as that in the first embodiment.

When a corner joint is formed by the above-described laser welding method, the metal plate 521 and the pipe member 522 can be joined with high strength and a high position tolerance in the same manner as in the first embodiment.

2. Circling Center Ax523 of Spots of Laser Beam LB

As shown in FIGS. 11A and 11B, according to the laser welding method of this embodiment, the circling center Ax523 of the spots of the laser beam LB is set at the portion where the lower surface 521b (one main surface) of the metal plate 521 and the outer peripheral surface 522a of the pipe member 522 are in contact with or most close to each other. Because of this, when the laser welding method according to this embodiment is used, the weld portion 523 having a substantially circular shape in a plan view, the weld portion 523 having the circling center Ax523 as its center in plan view, is formed.

However, the circling center Ax523 of the spots of the laser beam LB can be set within a range Ar522. Specifically, the range Ar522 is set in the following manner.

As shown in FIG. 11B, a part of the outer peripheral surface 522a of the pipe member 522 is brought into contact with or close to the lower surface 521b of the metal plate 521. At this time, under the metal plate 521, a virtual line L0 is drawn at a distance of a gap G2 from the lower surface 521b of the metal plate 521. Then, intersections of the virtual line L0 and the outer peripheral surface 522a of the pipe member 522 are defined as points P1 and P2.

The gap G2 is set as a gap equal to or smaller than ½ of the thickness T521 of the metal plate 521.

From the points P1 and P2, virtual lines L1 and L2 are drawn, the virtual line being perpendicular to the upper surface 521a of the metal plate 521, respectively. In this case, an area between the virtual line L1 and the virtual line L2 is defined as the range Ar522.

The range Ar522 is set in the above manner for the following reasons.

The inventors of the present invention have found that the gap G2 larger than ½ of the thickness T521 of the metal plate 521 gives rise to a problem that shearing strength decreases as the gap G2 increases and a problem that burn-through occurs. Having studied these problems intensively, the inventors of the present invention have found that the gap G2 becoming larger than ½ of T521 increases a bending stress acting on the weld portion 523 and increase of an amount of molten metal flowing into the gap G2 causes thickness irregularity and thickness reduction at a stress concentration part, which are considered to be the causes of a drop in strength. The inventors have thus concluded that, to ensure better welding quality, the gap G2 needs to be kept equal to or smaller than ½ of the thickness T521 of the metal plate 521.

A test has been conducted on two metal plates to check a relationship between a gap (GAP) and a tensile shear strength that the metal plates show when laser-welded. Test results show that the shear strength increases slightly up to a point of GAP being 20% of the thickness, that a shear strength increment drops at a point of GAP being 30%, that no shear strength increase results at a point of the GAP being 50%, and that shear strength decreases by 17% at a point of GAP being 70%.

In this embodiment, the above-described range Ar522 is defined when the metal plate 521 and the pipe member 522 are welded together. In this case, the second member is not limited to the pipe member 522 and may be provided as various types of members, such as a metal plate and a wire rod.

Sixth Embodiment

Figure 12:
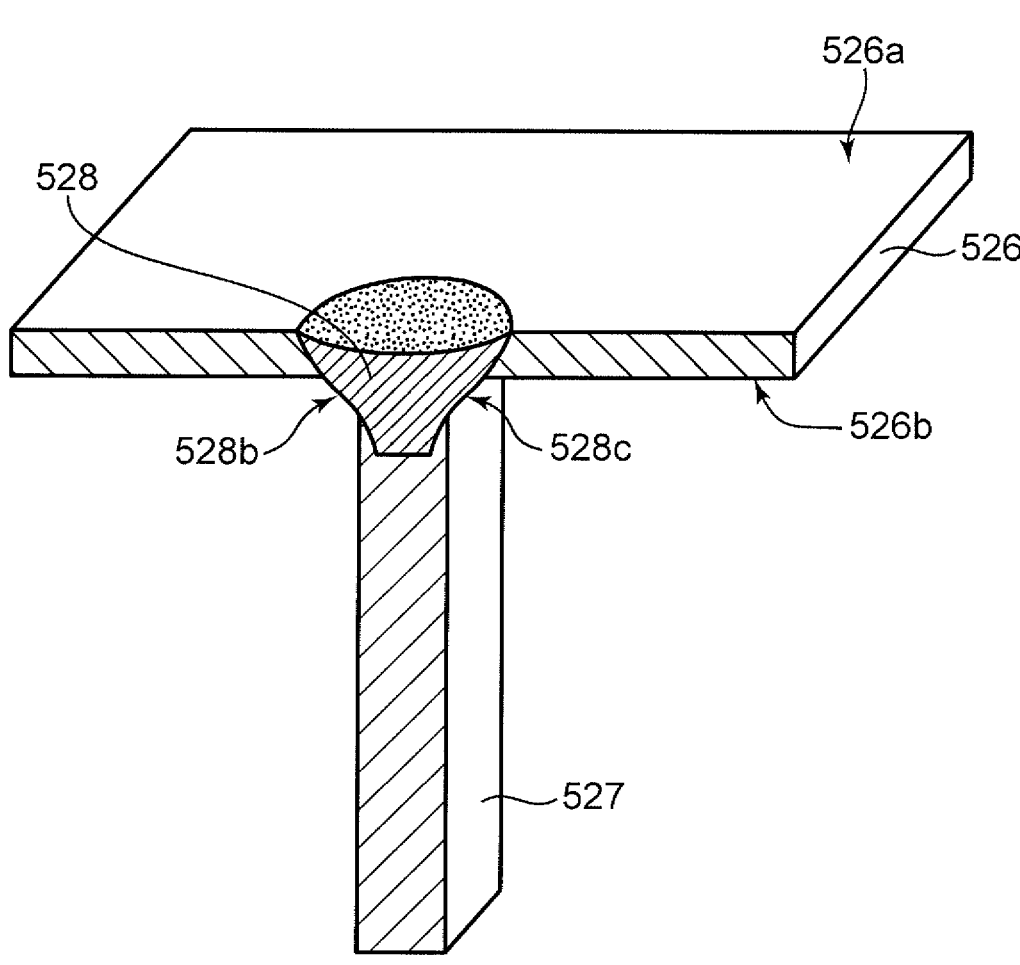
FIG. 12 is a perspective view (partial cross-sectional view) showing a weld portion formed by a laser welding method according to a sixth embodiment of the present invention.

FIG. 12 is a perspective view (partial cross-sectional view) showing a weld portion 528 having a substantially circular shape, the weld portion 528 being formed by a laser welding method according to a sixth embodiment.

In this embodiment, a laser welding device that is basically the same in configuration as the laser welding device 1 of the first embodiment is used. The sixth embodiment is different from the first embodiment in that a rod member 527 is used as the second member.

As shown in FIG. 12, by laser welding according to this embodiment, the rod member (second member) 527 is joined to a lower surface (one main surface) 526b of a metal plate (first member) 526. Specifically, an end face of the rod member 527 is brought into contact with or close to the lower surface 526b of the metal plate 526. Subsequently, an upper surface (the other main surface) 526a of the metal plate 526 is irradiated with the laser beam LB. In this embodiment, spots of the laser beam LB are caused to circle around a given part on the upper surface 526a of the metal plate 526, in the same manner as in the first embodiment. As a result, a weld portion 528 having a substantially circular shape in a plan view is formed.

At the same time, fillets 528b and 528c are formed on both sides of a portion where the rod member 527 is brought into contact with or close to the lower surface 526b of the metal plate 526.

An area of upper surface 526a to be irradiated with the laser beam LB is a part and its peripheral area, the part being opposite to the portion where the end face of the rod member 527 is brought into contact with or close to the lower surface 526b, across the thickness of the metal plate 526 in a plan view of the upper surface 526a. The definition of the area where the spots of the laser beam LB in the circular movement is the same as that in the first embodiment.

When the above laser welding method is used, the metal plate 526 and the rod member 527 can be joined with high strength and a high position tolerance in the same manner as in the first embodiment.

Seventh Embodiment

Figure 13:
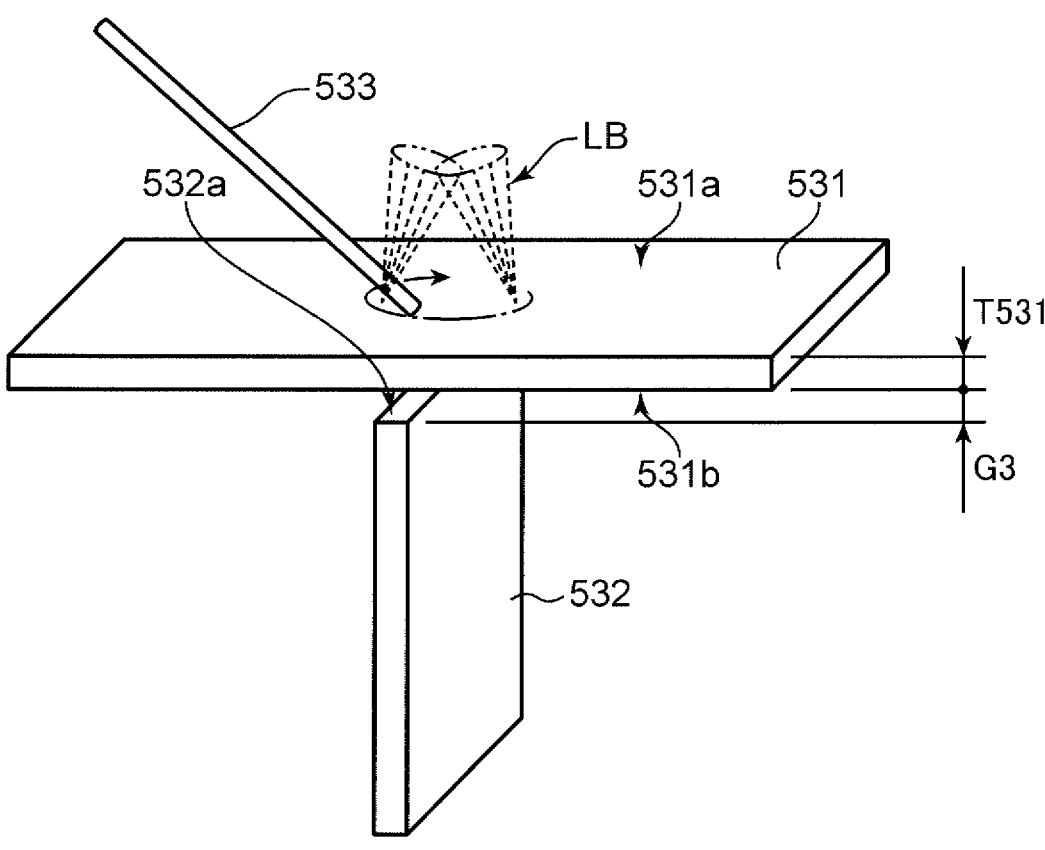
FIG. 13 is a perspective view for explaining a laser welding method according to a seventh embodiment of the present invention.

FIG. 13 is a perspective view for explaining a laser welding method according to a seventh embodiment.

In this embodiment, a laser welding device that is basically the same in configuration as the laser welding device 1 of the first embodiment is used. The seventh embodiment is different from the first embodiment in an arrangement pattern of metal plates, i.e., a metal plate 531 and a metal plate 532, and in that a wire (filler metal) 533 is supplied.

As shown in FIG. 13, by laser welding according to this embodiment, a T-shaped joint is formed, using two metal plates (first member and second member) 531 and 532, in the same manner as in the first embodiment. Specifically, an end face 532a of the metal plate 532 is brought close to a lower surface (one main surface) 531b of the metal plate 531. In this embodiment, a gap G3 between the lower surface 531b of the metal plate 531 and the end face 532a of the metal plate 532 is equal to or larger than ½ of the thickness T531 of the metal plate 531.

According to the laser welding method of this embodiment, an upper surface (the other main surface) 531a of the metal plate 531 is irradiated with the laser beam LB while the wire (filler metal) 533 is supplied to an irradiation area. In the same manner as in the first embodiment, the laser beam LB is caused to circle around a given part on the upper surface 531a of the metal plate 531. This forms a weld portion having a substantially circular shape in a plan view.

When a corner joint is formed by the above-described laser welding method, the metal plate 531 and the metal plate 532 can be joined with high strength and a high position tolerance, in the same manner as in the first embodiment.

When laser welding is performed on the metal plate 531 and the metal plate 532 arranged such that the gap G3 equal to or larger than ½ of the thickness T531 is formed between the metal plate 531 and the metal plate 532, not supplying the wire 533 may cause a problem of lower strength, burn-through, or the like. In this embodiment, in which the wire 533 is supplied during laser welding, however, a shortage of metal due to the gap G3 (a shortage of metal resulting from a flow of metal into the gap G3) can be compensated with supply of the wire 533, which prevents occurrence of the above problem of lower strength, burn-through, or the like.

The above does not describe any specific devices for supply of the wire 533, however, by providing a wire feeder (filler metal feeder) that feeds the wire 533 to the head or other parts of the welding robot 14, supply of the filler metal can be executed, as indicated in FIG. 13.

Eighth Embodiment

Figure 14A:
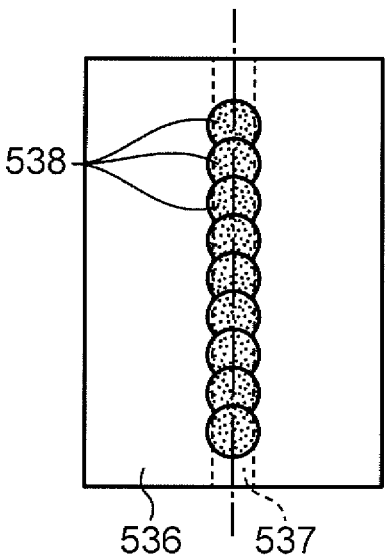
FIG. 14A is a plan view showing weld portions having substantially circular shapes in a plan view, the weld portions being foil ed by a laser welding method according to an eighth embodiment.

FIG. 14A is a plan view showing weld portions 538 of substantially circular shapes in a plan view, the weld portions 538 being formed by a laser welding method according to an eighth embodiment. In this embodiment, a laser welding device that is basically the same in configuration as the laser welding device 1 of the first embodiment is used.

As shown in FIG. 14A, by the laser welding method according to this embodiment, an end face of a metal plate 537 is brought into contact with or brought close to one main surface of a metal plate 536 (a main surface opposite to a main surface on the front side of the plane of FIG. 14A). Subsequently, a plurality of weld portions 538 of substantially circular shapes in a plan view are formed on the other main surface of the metal plate 536 (the main surface on the front side of the plane of FIG. 14A).

The plurality of weld portions 538 are formed in a state of overlapping each other, and are arranged in a direction in which the end face of the metal plate 537 extends.

The above-described laser welding method gives the same effects as those of the first embodiment, and is advantageous, for example, in performing welding that requires airtightness.

Ninth Embodiment

Figure 14B:
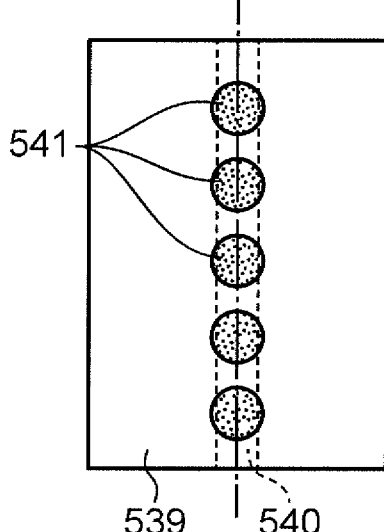
FIG. 14B is a plan view showing weld portions having substantially circular shapes in a plan view, the weld portions being formed by a laser welding method according to a ninth embodiment.

FIG. 14B is a plan view showing weld portions 541 of substantially circular shapes in a plan view, the weld portions 541 being formed by a laser welding method according to a ninth embodiment. In this embodiment, a laser welding device that is basically the same in configuration as the laser welding device 1 of the first embodiment is used.

As shown in FIG. 14B, by the laser welding method according to this embodiment, an end face of a metal plate 540 is brought into contact with or brought close to one main surface of a metal plate 539 (a main surface opposite to a main surface on the front side of the plane of FIG. 14B). Subsequently, a plurality of weld portions 541 of substantially circular shapes in a plan view are formed on the other main surface of the metal plate 539 (the main surface on the front side of the plane of FIG. 14B).

The plurality of weld portions 541 are formed in a state of being separated from each other, and are arranged in a direction in which the end face of the metal plate 540 extends.

Using the above-described laser welding method produces the same effects as the eighth embodiment produces.

Tenth Embodiment

Figure 14C:
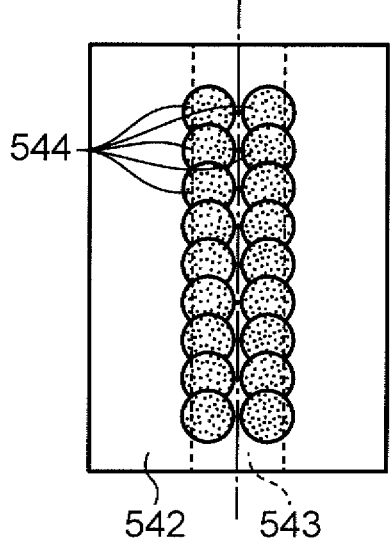
FIG. 14C is a plan view showing weld portions having substantially circular shapes in a plan view, the weld portions being formed by a laser welding method according to a tenth embodiment.

FIG. 14C is a plan view showing weld portions 544 of substantially circular shapes in a plan view, the weld portions 544 being formed by a laser welding method according to a tenth embodiment. In this embodiment, a laser welding device that is basically the same in configuration as the laser welding device 1 of the first embodiment is used.

As shown in FIG. 14C, by the laser welding method according to this embodiment, an end face of a metal plate 542 is brought into contact with or close to one main surface of a metal plate 543 (a main surface opposite to a main surface on the front side of the plane of FIG. 14C). Subsequently, a plurality of weld portions 544 of substantially circular shapes in a plan view are formed on the other main surface of the metal plate 542 (the main surface on the front side of the plane of FIG. 14C).

The plurality of weld portions 544 are formed into two rows of weld portions parallel to each other, and each row of weld portions are configured in the same manner as the row of weld portions in the eighth embodiment. The two rows are lined up at intervals.

The above-described laser welding method gives the same effects as those of the first embodiment, and is further advantageous than the laser welding method of the eighth embodiment, for example, in performing welding that requires airtightness.

Eleventh Embodiment

Figure 14D:
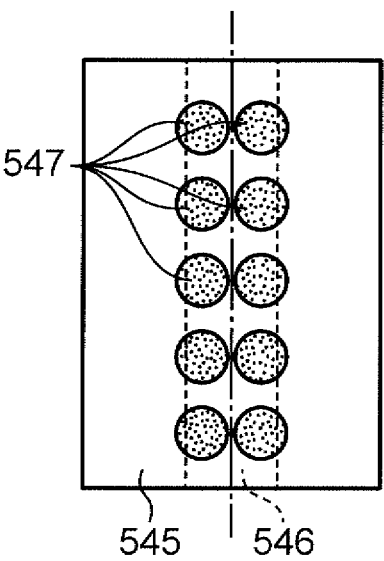
FIG. 14D is a plan view showing weld portions having substantially circular shapes in a plan view, the weld portions being formed by a laser welding method according to an eleventh embodiment.

FIG. 14D is a plan view showing weld portions 547 of substantially circular shapes in a plan view, the weld portions 547 being formed by a laser welding method according to an eleventh embodiment. In this embodiment, a laser welding device that is basically the same in configuration as the laser welding device 1 of the first embodiment is used.

As shown in FIG. 14D, by the laser welding method according to this embodiment, an end face of a metal plate 546 is brought into contact with or brought close to one main surface of a metal plate 545 (a main surface opposite to a main surface on the front side of the plane of FIG. 14D). Subsequently, a plurality of weld portions 547 of substantially circular shapes in a plan view are formed on the other main surface of the metal plate 545 (the main surface on the front side of the plane of FIG. 14D).

The plurality of weld portions 547 are arranged into rows of weld portions, each row of weld portions being the same as the row of weld portions of the ninth embodiment, and these rows are line up at intervals.

The above-described laser welding method gives the same effects as those of the first embodiment, and is further advantageous than the laser welding method of the ninth embodiment, for example, in performing welding that requires airtightness.

Twelfth Embodiment

Figure 14E:
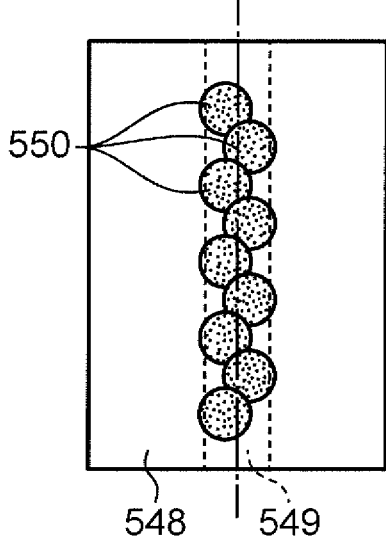
FIG. 14E is a plan view showing weld portions of substantially circular shapes in a plan view, the weld portions being formed by a laser welding method according to a twelfth embodiment.

FIG. 14E is a plan view showing weld portions 550 of substantially circular shapes in a plan view, the weld portions 550 being formed by a laser welding method according to a twelfth embodiment. In this embodiment, a laser welding device that is basically the same in configuration as the laser welding device 1 of the first embodiment is used.

As shown in FIG. 14E, by the laser welding method according to this embodiment, an end face of a metal plate 549 is brought into contact with or brought close to one main surface of a metal plate 548 (a main surface opposite to a main surface on the front side of the plane of FIG. 14E). Subsequently, a plurality of weld portions 550 of substantially circular shapes in a plan view are formed on the other main surface of the metal plate 548 (the main surface on the front side of the plane of FIG. 14E).

The plurality of weld portions 550 are formed in a state of partially overlapping each other, and are arranged into a zigzag pattern in a plan view.

The above-described laser welding method gives the same effects as those of the eighth embodiment.

Thirteenth Embodiment

Figure 14F:
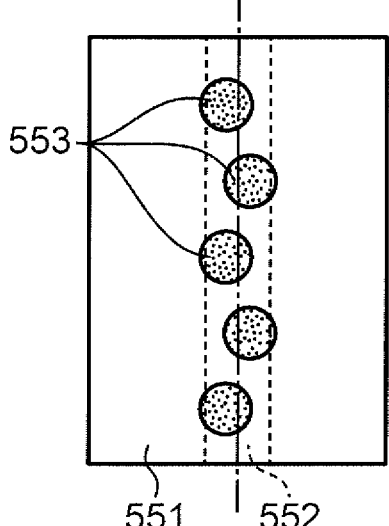
FIG. 14F is a plan view showing weld portions of substantially circular shapes in a plan view, the weld portions being formed by a laser welding method according to a thirteenth embodiment.

FIG. 14F is a plan view showing weld portions 553 of substantially circular shapes in a plan view, the weld portions 553 being formed by a laser welding method according to a thirteenth embodiment. In this embodiment, a laser welding device that is basically the same in configuration as the laser welding device 1 of the first embodiment is used.

As shown in FIG. 14F, by the laser welding method according to this embodiment, an end face of a metal plate 552 is brought into contact with or brought close to one main surface of a metal plate 551 (a main surface opposite to a main surface on the front side of the plane of FIG. 14F). Subsequently, a plurality of weld portions 553 of substantially circular shapes in a plan view are formed on the other main surface of the metal plate 551 (the main surface on the front side of the plane of FIG. 14F).

The plurality of weld portions 553 are formed in a state of being separated from each other, and are arranged into a zigzag pattern in a plan view.

The above-described laser welding method gives the same effects as those of the ninth embodiment.

Fourteenth Embodiment

Figure 15A:
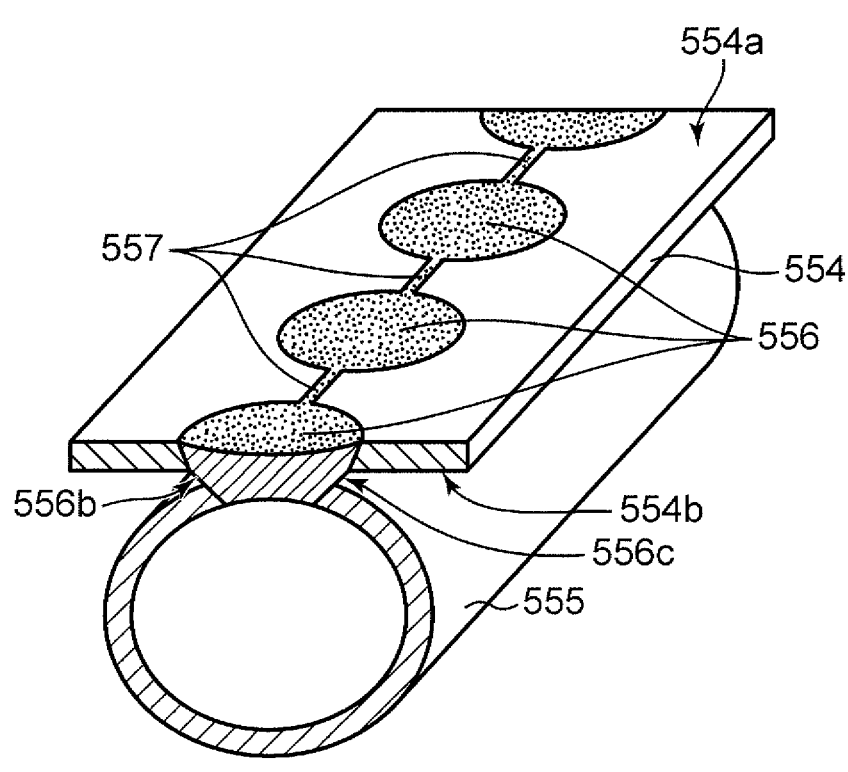
FIG. 15A is a perspective view (partial cross-sectional view) showing weld portions formed by a laser welding method according to a fourteenth embodiment.

FIG. 15A is a perspective view (partial cross-sectional view) showing weld portions (weld portions 556 of substantially circular shapes in a plan view and linear weld portions 557 of linear shapes in a plan view) formed by a laser welding method according to a fourteenth embodiment. In this embodiment, a laser welding device that is basically the same in configuration as the laser welding device 1 of the first embodiment is used.

As shown in FIG. 15A, by the laser welding method according to this embodiment, a part of the outer peripheral surface of a pipe member 555 is brought into contact with or brought close to a lower surface (one main surface) 554b of a metal plate 554. Subsequently, an upper surface (the other main surface) 554a of the metal plate 554 is irradiated with the laser beam LB to form a plurality of weld portions 556 of substantially circular shapes in a plan view and of linear weld portions 557 of linear shapes in a plan view.

At the same time, fillets 556b and 556c are formed on both sides of a portion where the pipe member 555 is brought into contact with or close to the lower surface 554b of the metal plate 554.

According to the laser welding method of this embodiment, the weld portions 556 and the linear weld portions 557 may be formed in succession, or may be formed such that the plurality of weld portions 556 are formed first and then the linear weld portions 557 are formed to bridge the weld portions 556. Forming the weld portions 556 and the linear weld portions 557 in succession is a process by which spots of the laser beam LB is made in a scanning movement while laser oscillation is maintained to consecutively form a series of the weld portions 556 and the linear weld portions 557 of substantially circular shapes.

The above-described laser welding method gives the same effects as those of the eighth embodiment, and is advantageous in ensuring higher airtightness.

Fifteenth Embodiment

Figures 15B, 15C:
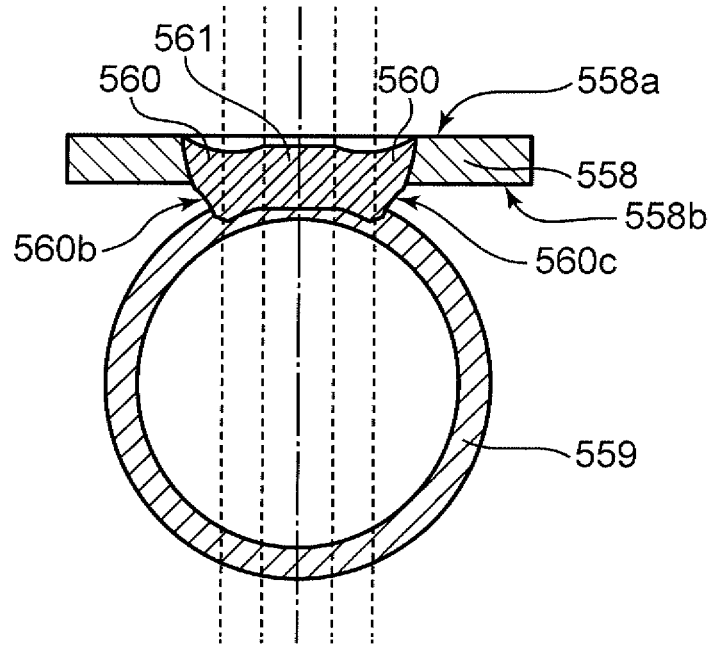
FIG. 15B is a plan view showing weld portions formed by a laser welding method according to a fifteenth embodiment.
FIG. 15C is a cross-sectional view showing the weld portion according to the fifteenth embodiment.

FIG. 15B is a plan view showing weld portions (weld portions 560 of substantially circular shapes in a plan view and a linear weld portion 561 of a linear shape in a plan view) formed by a laser welding method according to a fifteenth embodiment, and FIG. 15C is a cross-sectional view showing the weld portions (the weld portions 560 of substantially circular shapes in a plan view and the linear weld portion 561 of a linear shape in a plan view) formed by the laser welding method according to the fifteenth embodiment. In this embodiment, a laser welding device that is basically the same in configuration as the laser welding device 1 of the first embodiment is used.

As shown in FIG. 15B, also in the laser welding method according to this embodiment, a part of the outer peripheral surface of a pipe member 559 is brought into contact with or brought close to a lower surface (one main surface) 558b of a metal plate 558. Subsequently, an upper surface (the other main surface) 558a of the metal plate 558 is irradiated with the laser beam LB to form two weld portions 560 and one linear weld portion 561. The two weld portions 560 are separated from each other in the radial direction of the pipe member 559, and the linear weld portion 561 is formed to extend along the radial direction of the pipe member 559.

Meanwhile, fillets 560b and 560c are formed on both sides of a portion where the pipe member 559 is brought into contact with or close to the lower surface 558b of the metal plate 558.

According to the laser welding method of this embodiment, the weld portions 560 and the linear weld portion 561 of substantially circular shapes in a plan view may be formed in succession or may be formed such that the two weld portions 560 are formed first and then the linear weld portion 561 is formed to bridge the weld portions 560.

The above-described laser welding method gives the same effects as those of the fifth embodiment, and gives the following effect as well.

According to the laser welding method of this embodiment, for example, in a case where a contact portion is given a width to produce a fillet welding effect, attention is paid to a fact that a stress distribution resulting from application of a separation load or shear load indicates that a stress applied to a central part of the pipe member 559 is smaller than a stress applied to an end of the same in the radial direction, and the weld portions 560 are connected along the central part via the linear weld portion 561. This reduces work processes.

Sixteenth Embodiment

Figure 16A:
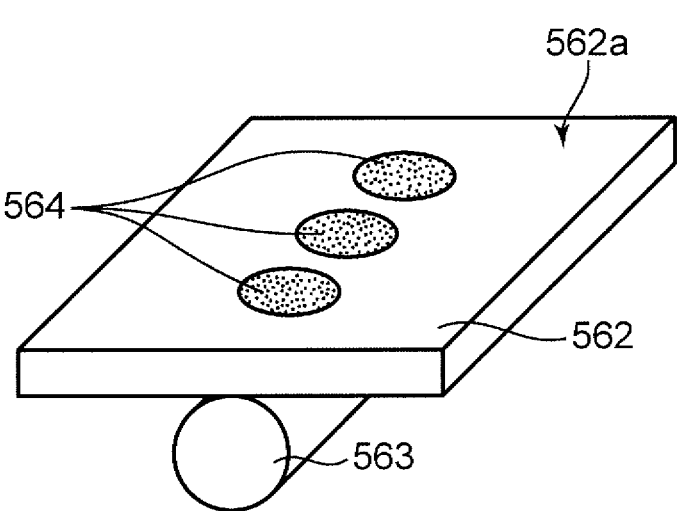
FIG. 16A is a perspective view showing weld portions formed by a laser welding method according to a sixteenth embodiment.
Figure 16B:
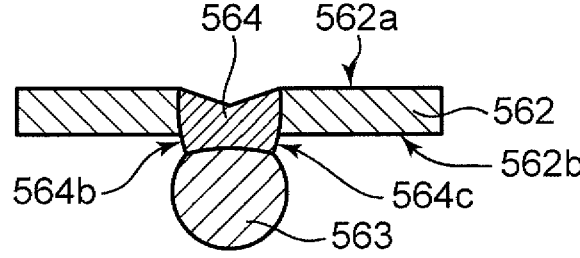
FIG. 16B is a cross-sectional view showing the weld portion according to a sixteenth embodiment.

FIG. 16A is a perspective view showing weld portions 564 of substantially circular shapes, the weld portions 564 being formed by a laser welding method according to a sixteenth embodiment, and FIG. 16B is a cross-sectional view showing the weld portion 564 having a substantially circular shape, the weld portion 564 being formed by the laser welding method according to the sixteenth embodiment. In this embodiment, a laser welding device that is basically the same in configuration as the laser welding device 1 of the first embodiment is used.

As shown in FIGS. 16A and 16B, by the laser welding method according to this embodiment, a part of the outer peripheral surface of a rod member (second member) 563 is brought into contact with or brought close to a lower surface (one main surface) 562b of a metal plate 562. Subsequently, an upper surface (the other main surface) 562a of the metal plate 562 is irradiated with the laser beam LB to form a plurality of weld portions 564 of substantially circular shapes in a plan view. The plurality of weld portions 564 are formed in a state of being separated from each other in a direction in which the wire rod 563 extends.

At the same time, fillets 564b and 564c are formed on both sides of a portion where the rod member 563 is brought into contact with or close to the lower surface 562b of the metal plate 562.

Using the above-described laser welding method allows the rod member 563 having a circular section to be jointed to the metal plate 562 with high strength and a high positional tolerance.

Seventeenth Embodiment

Figure 16C:
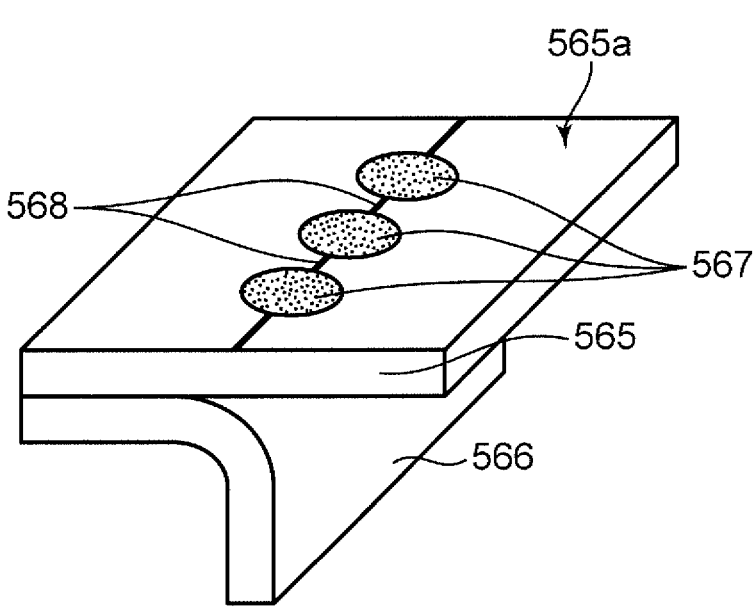
FIG. 16C is a perspective view showing weld portions formed by a laser welding method according to a seventeenth embodiment.
Figure 16D:
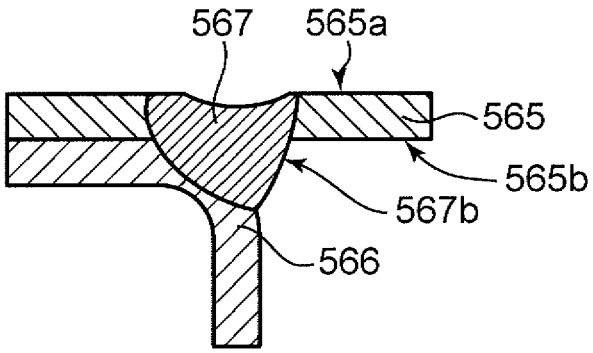
FIG. 16D is a cross-sectional view showing the weld portion according to a seventeenth embodiment.

FIG. 16C is a plan view showing weld portions (weld portions 567 of substantially circular shapes in a plan view and linear weld portions 568 of linear shapes in a plan view) formed by a laser welding method according to a seventeenth embodiment, and FIG. 16D is a cross-sectional view showing the weld portions (the weld portion 567 having a substantially circular shape in a plan view and the linear weld portion 568 of a linear shape in a plan view) formed by the laser welding method according to the seventeenth embodiment. In this embodiment, a laser welding device that is basically the same in configuration as the laser welding device 1 of the first embodiment is used.

As shown in FIGS. 16C and 16D, by the laser welding method according to this embodiment, a part of a metal plate 566 having an L-shaped section is brought into contact with a lower surface (one main surface) 565b of a metal plate 565. Subsequently, an upper surface (the other main surface) 565a of the metal plate 565 is irradiated with the laser beam LB to form three weld portions 567 and two linear weld portions 568. The three weld portions 567 are separated from each other, and the linear weld portions 568 are formed so as to bridge the weld portions 567.

According to the laser welding method of this embodiment, the weld portions 567 and the linear weld portion 568 may be formed by successive processes or may be formed such that the three weld portions 567 are formed first and then the linear weld portion 568 is formed to bridge the weld portions 567.

Meanwhile, a fillet 567b is formed near a portion where the metal plate 566 is brought into contact with the lower surface 565b of the metal plate 565.

The above-described laser welding method gives the same effects as those of the fourth embodiment, and is advantageous in performing welding that requires higher airtightness.

Eighteenth Embodiment

Figure 17:
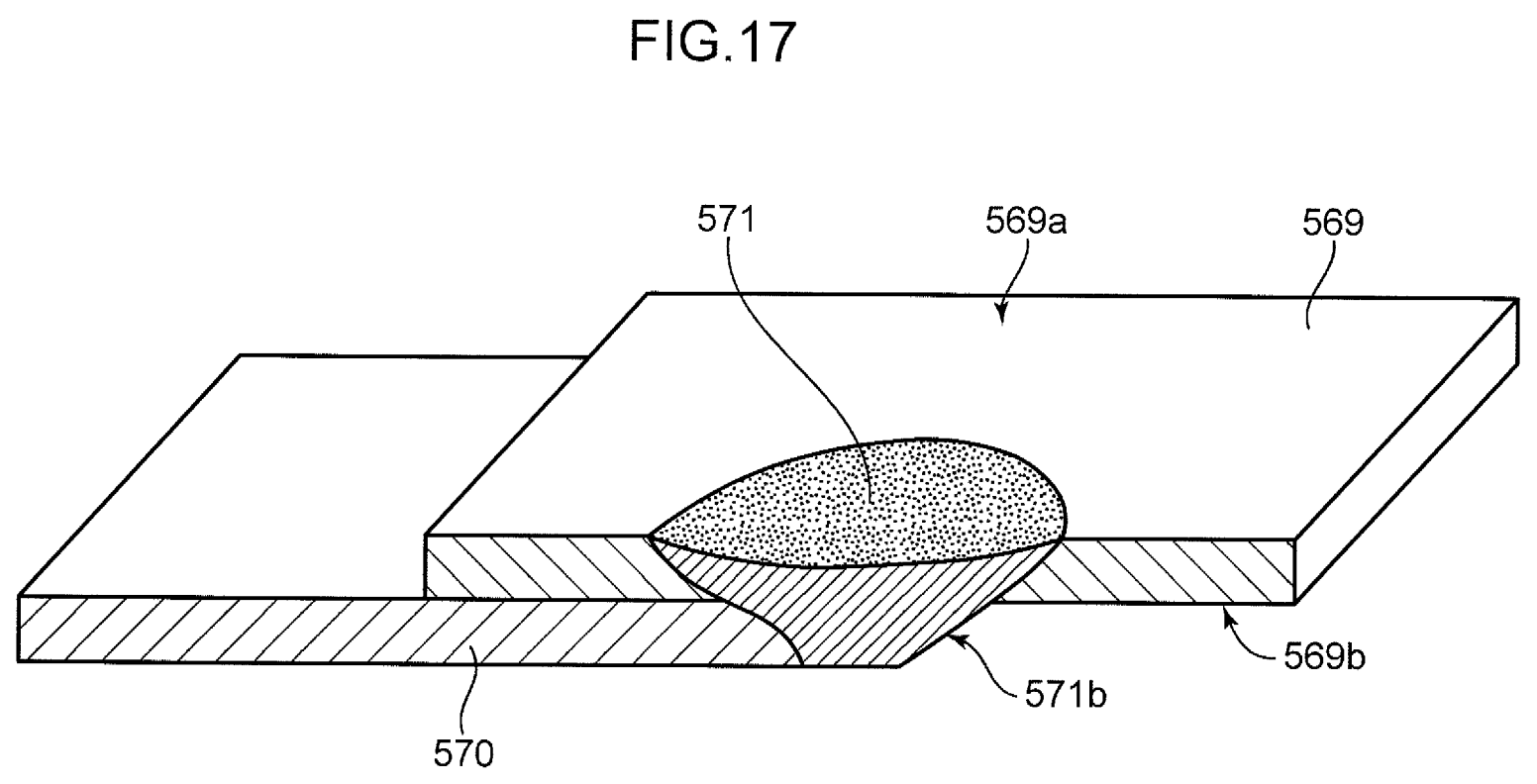

FIG. 17 is a perspective view (partial cross-sectional view) showing a weld portion 571 having a substantially circular shape, the weld portion 571 being formed by a laser welding method according to an eighteenth embodiment. In this embodiment, a laser welding device that is basically the same in configuration as the laser welding device 1 of the first embodiment is used.

As shown in FIG. 17, by laser welding according to this embodiment, a lap joint is formed, using two metal plates (first member and second member) 569 and 570. Specifically, the metal plate 570 is overlapped on a lower surface (one main surface) 569b of the metal plate 569. The metal plate 569 and the metal plate 570 may be overlapped on one another with no gap formed therebetween or may be overlapped on one another with a gap formed therebetween. Subsequently, an upper surface (the other main surface) 569a of the metal plate 569 is irradiated with the laser beam LB to form a weld portion 571 having a substantially circular shape in a plan view. Also in this embodiment, spots of the laser beam LB are caused to circle around a given part on the upper surface 569a of the metal plate 569, in the same manner as in the first to seventeenth embodiment. As a result, a weld portion 571 having a substantially circular shape in a plan view is formed.

Meanwhile, a fillet 571b is formed on an end of a portion where the metal plate 570 is overlapped on the lower surface 569b of the metal plate 569.

When a corner joint is formed by the above-described laser welding method, the metal plate 569 and the metal plate 570 can be joined with high strength and a high position tolerance in the same manner as in the first embodiment.

Confirming Effects

(1) Deformation Caused by Thermal Effects (Angular Deformation)

(i) Examples and Comparative Examples

Figure 18A:
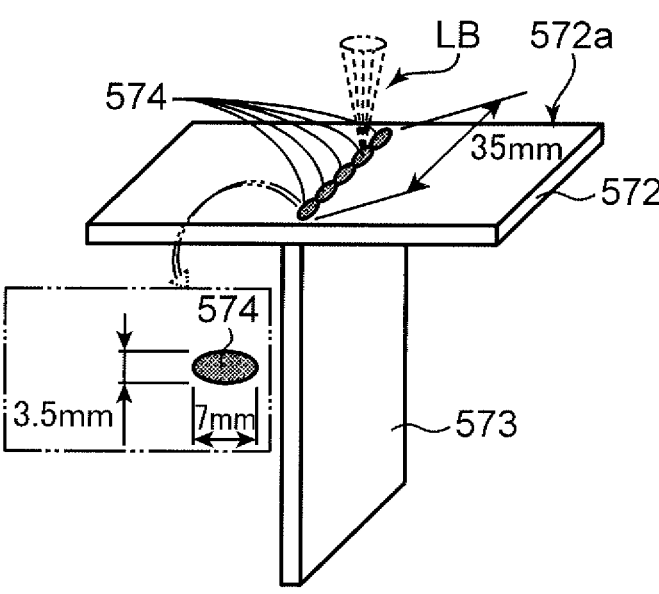
FIG. 18A is a perspective view showing a laser welding method according to an example.
Figure 18B:
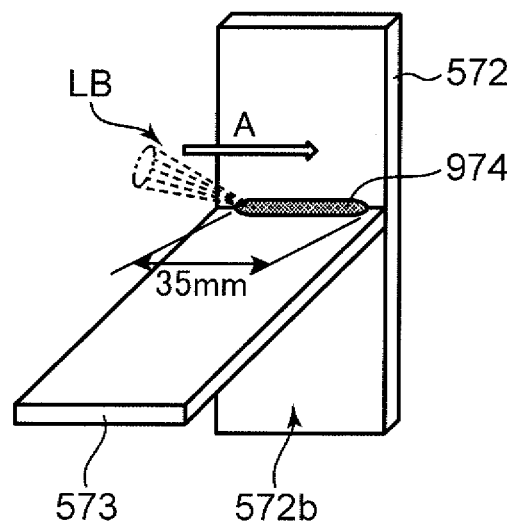
FIG. 18B is a cross-sectional view showing a laser welding method according to a comparative example.

FIG. 18A is a perspective view showing a laser welding method according to an example, and FIG. 18B is a perspective view showing a laser welding method according to a comparative example.

As shown in FIGS. 18A and 18B, hot-rolled steel plates (SPFH590) of 40 mm×100 mm×3.2 mm were prepared first. Then, an end face of a steel plate 573 was butted against a lower surface 572b of a steel plate 572.

EXAMPLE

As shown in FIG. 18A, by the laser welding method according to the example, an upper surface 572a of the steel plate 572 was irradiated with the laser beam LB, and spots of the laser beam LB were caused to circle around a given part in a scanning movement. This process formed five weld portions 574 of substantially elliptical shapes in plan view. Each of the weld portions 574 had a planar shape, as shown in a section encircled with a two-dot chain line, such that a major axis is 7 mm and a minor axis is 3.5 mm. Five weld portions 574 each having the 7 mm-long major axis formed one weld portion with a 35-mm long major axis.

A laser welding condition was set at a power output of 3500 W and a welding rate of 250 mm/sec.

Comparative Example

As shown in FIG. 18B, by the laser welding method according to the comparative example, the laser beam LB was applied from one side of a portion where the steel plate 573 is butted against the lower surface 572b of the steel plate 572, and spots of the laser beam LB were made in a scanning movement along an end side of the steel plate 573 butted against the lower surface 572b. As a result, a linear weld portion 974 was formed along the end side of the steel plate 573. The length of the linear weld portion 974 was determined to be 35 mm.

A laser welding condition was set at a power output of 3500 W and a welding rate of 50 mm/sec.

(ii) Deformation (Angular Deformation)

Figure 18C:
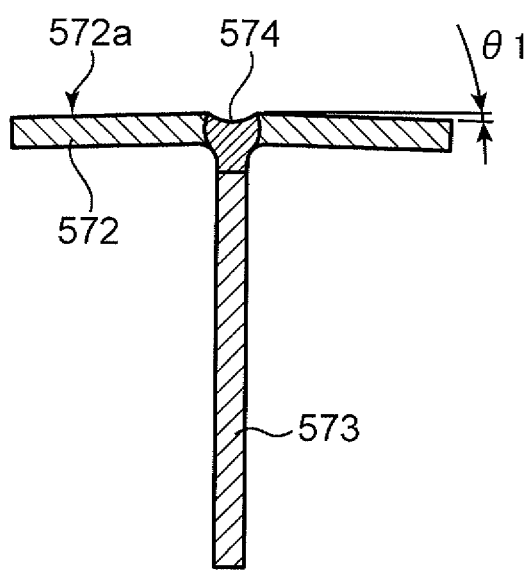
FIG. 18C is a cross-sectional view showing a state of a change in the shape of a steel plate making up a T-shaped joint formed by the laser welding method according to the example.
Figure 18D:
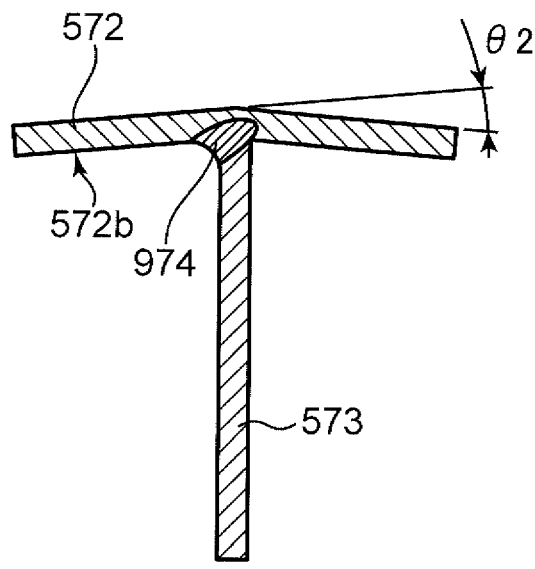
FIG. 18D is a cross-sectional view showing a state of a change in the shape of the steel plate making up a T-shaped joint formed by the laser welding method according to the comparative example.

FIG. 18C is a cross-sectional view showing a state of a deformation of a steel plate 572 making up a T-shaped joint formed by the laser welding method according to the example, and FIG. 18D is a cross-sectional view showing a state of a deformation of the steel plate 572 making up a T-shaped joint formed by the laser welding method according to the comparative example.

As shown in FIG. 18C, by the laser welding method according to the example, the steel plate 572 was deformed by an angle θ1. The angle θ1 was about 0.1 degree.

By the laser welding method according to the comparative example, on the other hand, the steel plate 572 was deformed by an angle θ2, as shown in FIG. 18D. The angle θ2 was about 0.5 degree.

As described above, the case of using the laser welding method according to the example reduced the amount of angular deformation (distortion) to about ⅕ of the amount of angular deformation in the case of using the laser welding method according to the comparative example which is similar to the laser welding according to the conventional technique. The laser welding method according to the example thus allows joining with high strength and less distortion.

(2) Fatigue Strength

(i) Test Method

Figure 19A:
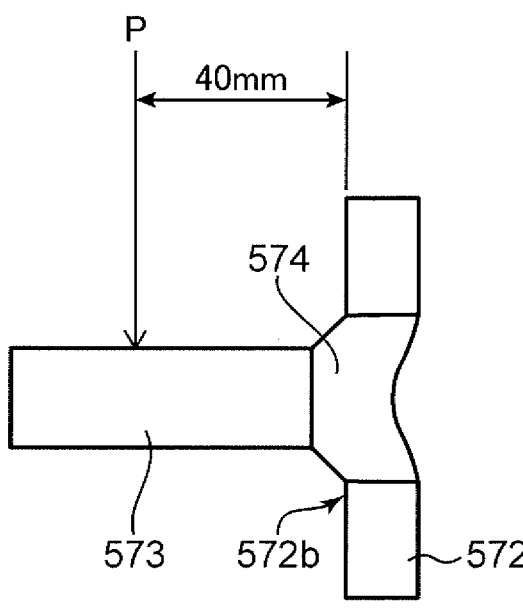
FIG. 19A is a schematic view showing a method of a fatigue strength test of a sample according to the example.
Figure 19B:
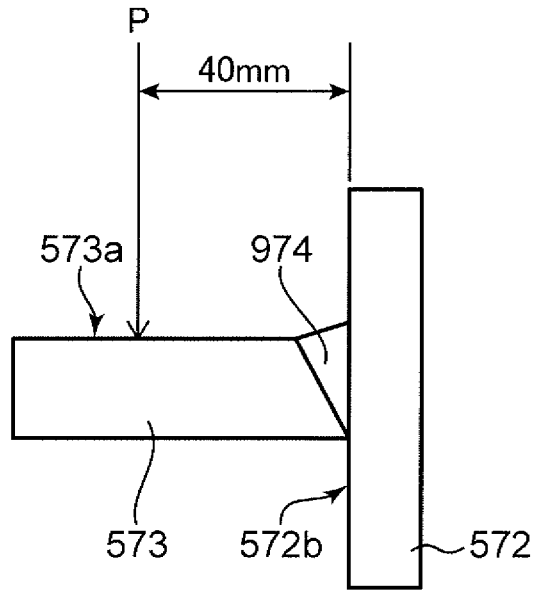
FIG. 19B is a schematic view showing a first method of a fatigue strength test of a sample according to the comparative example.
Figure 19C:
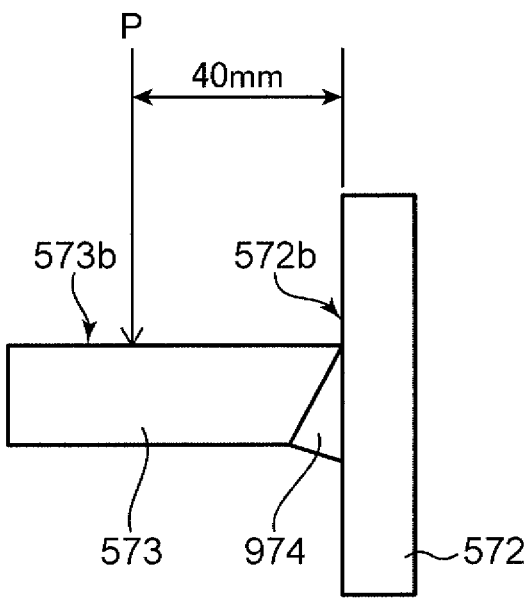
FIG. 19C is a schematic view showing a second method of a fatigue strength test of a sample according to the comparative example.

FIG. 19A is a schematic view showing a method of a fatigue strength test of a sample according to the example, FIG. 19B is a schematic view showing a first method of a fatigue strength test of a sample according to the comparative example (a method of comparative example 1), and FIG. 19C is a schematic view showing a second method of a fatigue strength test of a sample according to the comparative example (a method of comparative example 2).

EXAMPLE

As shown in FIG. 19A, a sample of the T-shaped joint according to the above example was prepared, and the steel plate 572 was fixed. Then, a load P ranging from 100 N to 800 N was applied repeatedly to a part of the steel plate 573, the part being 40 mm distant from the lower surface 572b of the steel plate 572, until the steel plate 573 was broken.

Method of Comparative Example 1

As shown in FIG. 19B, a sample of the T-shaped joint according to the comparative example was prepared, and the steel plate 572 was fixed. Then, in the same manner as in the example, the load P ranging from 100 N to 800 N was applied repeatedly to a part of a main surface 573a irradiated with the laser beam LB when a weld portion 974 is formed on in the steel plate 573, the part being 40 mm distant from the lower surface 572b of the steel plate 572, until the main surface 573a was broken.

Method of Comparative Example 2

As shown in FIG. 19C, a sample of the T-shaped joint according to the comparative example was prepared, and the steel plate 572 was fixed. Then, in the same manner as in the example, the load P ranging from 100 N to 800 N was applied repeatedly to a part of a main surface 573b opposite to the main surface 573a irradiated with the laser beam LB when the weld portion 974 is formed on the steel plate 573, the part being 40 mm distant from the lower surface 572b of the steel plate 572, until the main surface 573b was broken.

(ii) Results of Fatigue Strength Test

Figure 20:
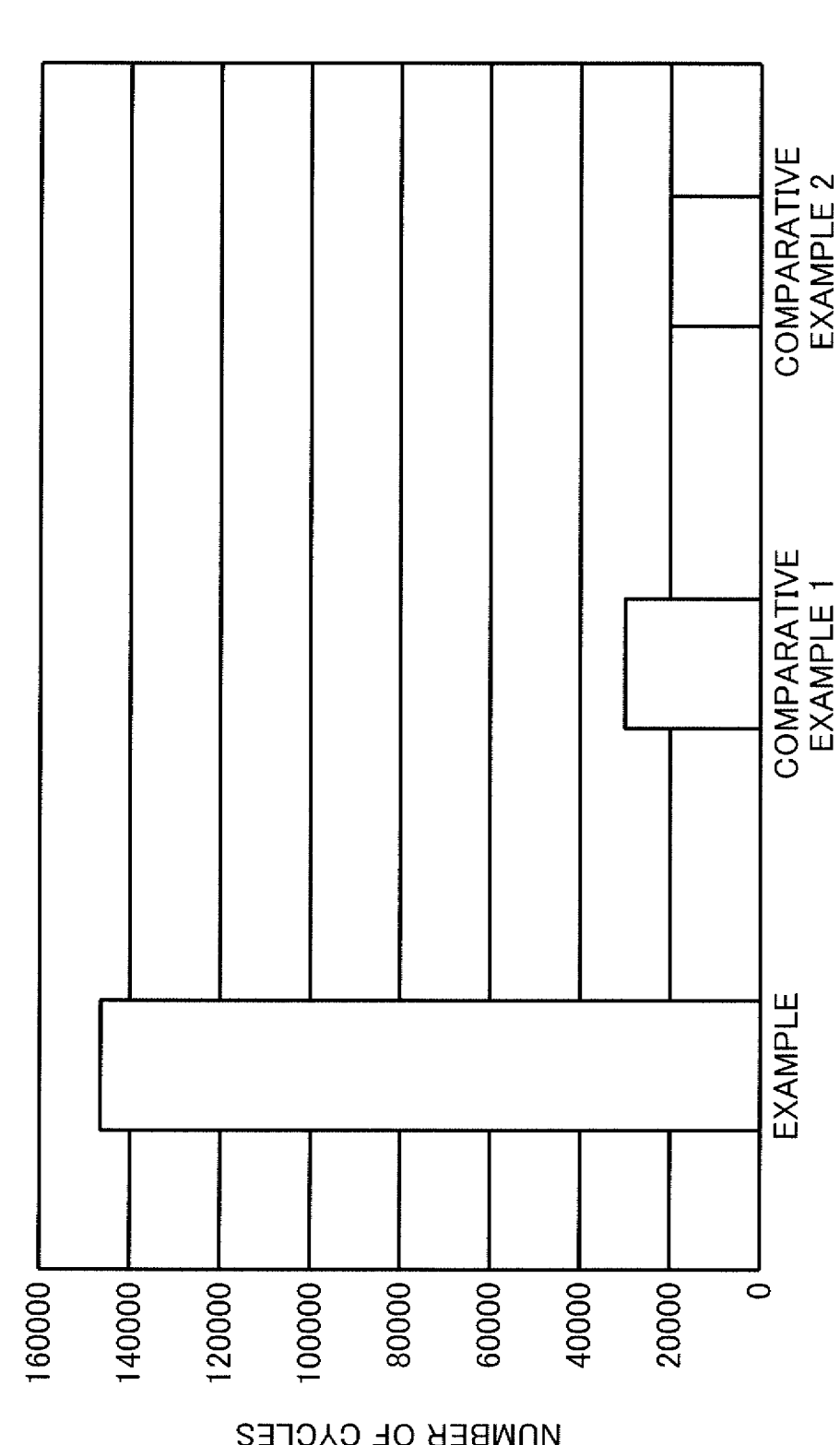
FIG. 20 is a graph showing results of fatigue strength tests.

FIG. 20 is graph showing results of a fatigue strength test.

As shown in FIG. 20, in the example, the number of break cycles has exceeded 140,000. In contrast, the number of break cycles has not reached 30,000 in the comparative example 1, and has not reached even 20,000 in the comparative example 2.

These results have led to a conclusion that the joint of the example has a fatigue strength that is 4 to 5 times the fatigue strength of the joint of the comparative example 1 and that is 7 times or more the fatigue strength of the joint of the comparative example 2.

If fillets are formed respectively on both main surfaces 573a and 573b of the steel plate 573 by using the laser welding method according to the conventional technique, the fatigue strength may be improved to some extent. Forming fillets on both main surfaces 573a and 573b in this manner, however, requires that a plurality of cycles of irradiation of the laser beam LB be carried out or a plurality of laser heads be prepared, in which case lower productivity is inevitable.

Besides, on the T-shaped joint formed by the laser welding method according to the example, the fillet has a recessed curved surface (rounded surface), similar to the fillets of the first to eighteenth embodiments. Such a fillet hardly allows stress concentration to occur, and therefore a separate process for reducing stress concentration (e.g., laser peening, grinding, and the like) or an additional pre-process or post-process is unnecessary. This is advantageous in ensuring high productivity.

[Modifications]

In the first embodiment and the third embodiment to the eighteenth embodiment, laser welding is performed to join two members, and in the second embodiment, laser welding is performed to join three members. The present invention is, however, not limited by these embodiments. For example, the above laser welding method can be used to join one metal plate (first member) and three or more second members.

In the first to eighteenth embodiments, the weld portions 503, 509, 513, 518, 523, 528, 538, 541, 544, 547, 550, 553, 556, 560, 564, 567, and 571 of substantially circular shapes in a plan view are formed, respectively; while in the example, the weld portion 574 having a substantially elliptical shape is fondled. The present invention is, however, not limited by these embodiments and example. For example, a weld portion of an oval shape in a plan view or a weld portion of a polygonal shape (a polygonal shape with rounded corners) in plan view may be formed.

In the above first and eighteenth embodiments, the light-condensing unit 13 is controlled to cause the spots of the laser beam LB in a scanning movement. The present disclosure, however, is not limited by these embodiments. For example, spots of the laser beam LB may be made in the scanning movement by driving and controlling the front end of the welding robot 14 or by using an X-Y table or the like.

In the first to eighteenth embodiments, spots of the laser beam LB are made in a movement during welding. The present disclosure, however, is not limited by these embodiments. For example, the first member and the second member, which are to be welded, are moved to create a situation where the spots of the laser beam LB are made in the scanning movement relative to the first and the second members.

Further, according to the present invention, laser welding may be executed as any given combination of the first to eighteenth embodiments.

SUMMARY

A laser welding method according to one aspect of the present invention is a laser welding method for joining a first member in the shape of a plate and made of a metal material to a second member made of a metal material by laser welding. The laser welding method includes: an arranging step of bringing the second member into contact with or close to one main surface of the first member; and a laser beam irradiation step of irradiating a laser beam to the other main surface of the first member, the other main surface being a main surface opposite to the one main surface of the first member which the second member is brought into contact with or brought close to. In the laser beam irradiation step, the first member and the second member are melted to form a weld portion having a substantially circular or oval shape in a plan view and form a fillet on a joined portion between the first member and the second member.

According to the laser welding method of the above aspect, by irradiating the laser beam to the other main surface of the first member, the other main surface being the main surface opposite to the one main surface of the first member which the second member is brought into contact with or brought close to, a process of irradiating the laser beam to a side having a complicated shape can be avoided. This makes unnecessary execution of a plurality of cycles of laser irradiation or use of a plurality of laser heads, the laser irradiation cycles and laser heads being required to form a complicated shape, an additional process or dedicated device for irradiating the laser beam to an unreachable part, and limitation to an irradiation direction, thus providing solutions to the problems described in (v), (viii), and (ix).

According to the laser welding method of the above aspect, the weld portion having a substantially circular or an oval shape in a plan view is formed to give a large weld width. This improves a tolerance for a positional misalignment of the laser beam or the member to be welded and allows laser beam irradiation to complete within the weld portion, thus preventing a case where beat input increases in the latter half of a welding process and burning-through control becomes difficult. In addition, as a result of achievement of the large weld width and a large penetration depth, welding heat does not concentrate and molten pools are formed respectively on both surfaces of the member to be welded in a semi-symmetrical manner. This further reduces the amount of angular deformation (distortion). A wider and deeper welding results in an increase in the amount of molten metal. If a joined portion has a gap of an appropriate size, part of molten metal flows into the gap without any supply of filler metal or additional fillet shape and, due to a surface tension, forms a recessed curved surface (rounded shape) without being subjected to a separate process, thus creating a fillet where stress concentration hardly occurs. In addition, a portion of increased molten metal flows into a part with low precision of a groove for butting, such as a shear surface or a fracture surface of a press working, or into a work gap resulting from errors in precision of stacking a plurality of members. The molten metal flow ensures the sufficient joining strength of the part or work gap, thus proving solutions to the problems described in (i) to (iv), (vi), and (vii).

Hence the laser welding method according to the above aspect can solve the problems described in (i) to (ix). By the laser welding method according to the above aspect, therefore, when metal members of various shapes are welded to a metal plate, a fillet with a high positional tolerance can be formed without adding a filler metal even in a complicated joining form, which allows the metal members to be joined with high strength at high productivity.

According to the laser welding method of the above aspect, an area in which a gap between a surface of the second member and the one main surface of the first member which the second member is brought into contact with or brought close to, is equal to or smaller than $\frac{1}{2}$ of a thickness of the first member may be projected over the other main surface of the first member, and the projected area may be defined as a given area that is an area to be irradiated with the laser beam.

As described above, by setting the given area that is the area to be irradiated with the laser beam, as the projected area, a sufficiently large fillet can be formed on a joined portion between the first member and the second member, without adding a filler metal or an extra shape for fillet formation. Adopting the above configuration is, therefore, advantageous in joining the first member and the second member with higher strength.

According to the laser welding method of the above aspect, in the laser beam irradiation step, the spots may be orbitally run until having a diameter larger than a spot dimeter of the laser beam around a given part with a center located within the given area of the first member.

As described above, when a weld portion and a fillet are formed by causing the spots of the laser beam to circle in the scanning movement around the given part, the first member and the second member are melted and stirred to form the weld portion. Therefore, even if a gap exists between the first member and the second member, molten metal can be caused to flow into the gap, which produces high welding strength.

According to the laser welding method of the above aspect, in a case where a gap between a surface of the second member and the one main surface of the first member which the second member is brought into contact with or brought close to is equal to or larger than $\frac{1}{2}$ of a thickness of the first member, an area in a direction of width of the second member may be projected over the other main surface of the first member and the projected area may be set as a given area that is an area to be irradiated with the laser beam. In the laser beam irradiation step, the spots may be orbitally run until having a diameter larger than a spot dimeter of the laser beam around a given part with a center located within the given area of the first member, and a filler metal may be supplied to a range irradiated with the laser beam.

As described above, when the gap is equal to or larger than $\frac{1}{2}$ of the thickness of the first member, the filler metal is supplied to the range irradiated with the laser beam to prevent occurrence of problems of a drop in joining strength, burn-through, and the like. Thus, when the above configuration is adopted, even if the gap is equal to or larger than $\frac{1}{2}$ of the thickness of the first member, the first member and the second member can be joined with high strength.

According to the laser welding method of the above aspect, a plurality of the weld portions may be formed.

As described above, by forming a plurality of the weld portions, the first member and the second member can be joined with high strength while preventing a problem of burn-through and the like caused by too much heat input to an end or at the latter half of welding.

According to the laser welding method of the above aspect, in the laser beam irradiation step, a plurality of the weld portions separated from each other are formed and then a linear weld portion of a linear shape in a plan view may be formed so as to connect the weld portions adjacent to each other.

As described above, forming the linear weld portion so as to connect the weld portions adjacent to each other ensures airtightness and allows saving man-hour for working on a part where stress is low.

According to the laser welding method of the above aspect, in the laser beam irradiation step, a plurality of the weld portions separated from each other are formed and simultaneously, linear weld portions of linear shapes in a plan view may be formed in succession so as to connect the weld portions adjacent to each other.

As described above, in the case where the plurality of weld portions (weld portions formed by the spots in the circular scanning movement) are formed and at the same time, the linear weld portions are formed in succession, airtightness is ensured and man-hour for working on a part where stress is low is saved in the same manner as in the case where the plurality of the weld portions are formed and then the linear weld portion is formed.

A laser welding device according to one aspect of the present invention is a laser welding device that joins a first member in the shape of a plate and made of a metal material to a second member made of a metal material, by laser welding. The laser welding device includes: a laser oscillator that oscillates a laser beam; a light-condensing unit that condenses the laser beam; a scanning unit that makes spots of the laser beam in a scanning movement; and a control unit that controls the laser oscillator and the scanning unit. In a state in which the second member is brought into contact with or brought close to one main surface of the first member, the control unit performs control to irradiate the other main surface of the first member with the laser beam, the other main surface being a main surface opposite to the one main surface of the first member which the second member is brought into contact with or brought close to, and irradiation of the laser beam melts the first member and the second member to form a weld portion having a substantially circular or an oval shape in a plan view and form a fillet on a joined portion between the first member and the second member.

According to the laser welding device of the above aspect, by irradiating the laser beam to the other main surface of the first member, the other main surface being a main surface opposite to the one main surface of the first member which the second member is brought into contact with or brought close to, a process of irradiating the laser beam to a side having a complicated shape can be avoided. This makes unnecessary execution of a plurality of cycles of laser irradiation or use of a plurality of laser heads, the laser irradiation cycles and laser heads being needed to form a complicated shape, an additional process or dedicated device for irradiating the laser beam to an unreachable part, and limitation to an irradiation direction, thus providing solutions to the problems described in (v), (viii), and (ix).

According to the laser welding device of the above aspect, the weld portion having a substantially circular or an oval shape in a plan view is formed to give a large weld width. This improves a tolerance for a positional misalignment of the laser beam or the member to be welded and allows laser beam irradiation to complete within the weld portion, thus preventing a case where heat input increases in the latter half of a welding process and burning-through control becomes difficult. In addition, as a result of achievement of the large weld width and a large penetration depth, welding heat does not concentrate and molten pools are formed respectively on both surfaces of the member to be welded in a semi-symmetrical manner. This further reduces the amount of angular deformation (distortion). A wider and deeper welding results in an increase in the amount of molten metal to flow in. If a joined portion has a gap of an appropriate size, part of molten metal flows into the gap without any supply of filler metal or additional fillet shape and, due to a surface tension, forms a recessed curved surface (rounded shape) without being subjected to a separate process, thus creating a fillet where stress concentration hardly occurs. In addition, a portion of increased molten metal flows into a part with low precision of a groove for butting, such as a shear surface or a fracture surface of a press working, or into a work gap resulting from errors in precision of stacking a plurality of members. The molten metal flow ensures the sufficient joining strength of the part or work gap, thus proving solutions to the problems described in (i) to (iv), (vi), and (vii).

Hence the laser welding device according to the above aspect can solve the problems described in (i) to (ix). According to the laser welding device of the above aspect, therefore, when metal members of various shapes are welded to a metal plate, a fillet with a high position tolerance can be formed without adding a filler metal even in a complicated joining form, which allows the metal members to be joined with high strength at high productivity.

According to the laser welding device of the above aspect, a area in which a gap between a surface of the second member and the one main surface of the first member which the second member is brought into contact with or brought close to, is equal to or smaller than ½ of a thickness of the first member may be projected over the other main surface of the first member, and the projected area may be defined as a given area that is an area to be irradiated with the laser beam.

As described above, by setting the given area that is the area to be irradiated with the laser beam, as the projected area, a sufficiently large fillet can be formed on a joined portion between the first member and the second member, without adding a filler metal or an extra shape for fillet formation. Adopting the above configuration is, therefore, advantageous in joining the first member and the second member with higher strength.

According to the laser welding device of the above aspect, at a time of irradiation with the laser beam, the spots may be orbitally run until having a diameter larger than a spot dimeter of the laser beam around a given part with a center located within the given area of the first member.

As described above, when a weld portion and a fillet are formed by causing the spots of the laser beam to circle in the scanning movement around the given part, the first member and the second member are melted and stirred to form the weld portion. Therefore, even if a gap exists between the first member and the second member, molten metal can be caused to flow into the gap, which produces high welding strength.

The laser welding device of the above aspect may further include a filler metal feeder that supplies a filler metal. According to the laser welding device, when a gap between a surface of the second member and the one main surface of the first member which the second member is brought into contact with or brought close to is equal to or larger than ½ of a thickness of the first member, an area in a direction of width of the second member may be projected over the other main surface of the first member and the projected area may be set as a given area that is an area to be irradiated with the laser beam. At the time of irradiation with the laser beam, the spots may be orbitally run until having a diameter larger than a spot dimeter of the laser beam around a given part with a center located within the given area of the first member, and a filler metal may be supplied to a range irradiated with the laser beam.

As described above, when the gap is equal to or larger than ½ of the thickness of the first member, the filler metal is supplied to the range irradiated with the laser beam to prevent occurrence of problems of a drop in joining strength, burn-through, and the like. Thus, when the above configuration is adopted, even if the gap is equal to or larger than ½ of the thickness of the first member, the first member and the second member can be joined with high strength.

According to the laser welding device of the above aspect, a plurality of the weld portions may be formed by irradiation of the laser beam.

As described above, by forming a plurality of the weld portions, the first member and the second member can be joined with high strength while preventing a problem of burn-through and the like caused by too much heat input to an end or at the latter half of welding.

According to the laser welding device of the above aspect, at the time of irradiation with the laser beam, a plurality of the weld portions separated from each other are formed and then a linear weld portion of a linear shape in a plan view may be formed so as to connect the weld portions adjacent to each other.

As described above, forming the linear weld portion so as to connect the weld portions adjacent to each other ensures airtightness and allows saving man-hour for working on a part where stress is low.

According to the laser welding device of the above aspect, at the time of irradiation with the laser beam, a plurality of the weld portions separated from each other are formed and simultaneously, linear weld portions of linear shapes in a plan view may be formed in succession so as to connect the weld portions adjacent to each other.

As described above, in the case where the plurality of weld portions (weld portions formed by the spots in the circular scanning movement) are formed and at the same time, the linear weld portions are formed in succession, airtightness is ensured and man-hour for working on a part where stress is low is saved in the same manner as in the case where the plurality of the weld portions are formed and then the linear weld portion is formed.

As described above, in each of the above embodiments, when metal members of various shapes are welded to a metal plate, a fillet with a high position tolerance can be formed without adding a filler metal even in a complicated joining form, and the metal members can be joined with high strength at high productivity.

The invention claimed is:

1. A laser welding method for joining a first member in the shape of a plate and made of a metal material to a second member made of a metal material by laser welding, the laser welding method comprising:
an arranging step of bringing the second member into contact with or close to one main surface of the first member; and
a laser beam irradiation step of irradiating a laser beam to the other main surface of the first member, the other main surface being a main surface opposite to the one main surface of the first member which the second member is brought into contact with or brought close to, wherein
in the laser beam irradiation step, the first member and the second member are melted to form:
a weld portion having a substantially circular or oval shape in a plan view;
a linear weld portion connected to the weld portion and having a linear shape in the plan view; and
a fillet on a joined portion between the first member and the second member,
in the arranging step, the second member is arranged relative to the first member so that the second member is brought into contact with or brought close to the one main surface of the first member in only a linear region in the plan view,
the second member is curved in the linear region, and
in the laser beam irradiation step, the linear weld portion is formed so that a whole of or a part of the linear weld portion extends beyond the linear region in the plan view.

2. The laser welding method according to claim 1, wherein
an area in which a gap between a surface of the second member and the one main surface of the first member which the second member is brought into contact with or brought close to is equal to or smaller than ½ of a thickness of the first member is projected over the other main surface of the first member and the projected area is a given area that is irradiated with the laser beam.

3. The laser welding method according to claim 2, wherein
in the laser beam irradiation step, the laser beam is orbitally scanned around a given part having a center within the given area of the first member until reaching a circle having a diameter larger than a diameter of a spot of the laser beam.

4. The laser welding method according to claim 1, wherein
in a case where a gap between an end face of the second member and the one main surface of the first member which the end face of the second member is brought close to is equal to or larger than ½ of a thickness of the first member, the end face of the second member is projected over the other main surface of the first member and the projected area is a given area that is irradiated with the laser beam, and
in the laser beam irradiation step, the laser beam is orbitally scanned around a given part having a center within the given area of the first member until reaching a circle having a diameter larger than a diameter of a spot of the laser beam, and a filler metal is supplied to an area irradiated with the laser beam.

5. The laser welding method according to claim 1, wherein a plurality of weld portions are formed.

6. The laser welding method according to claim 5, wherein in the laser beam irradiation step, after a plurality of weld portions are formed at a distance from each other, the linear weld portion is formed to connect the weld portions adjacent to each other.

7. The laser welding method according to claim 5, wherein in the laser beam irradiation step, forming of weld portions at a distance from each other and forming of the linear weld portion to connect the weld portions adjacent to each other are performed one after another.

8. A laser welding device that joins a first member in the shape of a plate and made of a metal material to a second member made of a metal material by laser welding, the laser welding device comprising:

a laser oscillator that generates a laser beam;

a scanning unit that scans the laser beam to form a spot while condensing the laser beam on a welding position; and a control unit that controls the laser oscillator and the scanning unit, wherein the control unit allows the other main surface of the first member to be irradiated with the laser beam, the other main surface being a main surface opposite to the one main surface of the first member which the second member is brought into contact with or brought close to, in a state in which the second member is brought into contact with or brought close to one main surface of the first member, whereby the irradiation of the laser beam melts the first member and the second member to form a weld portion having a substantially circular or oval shape in a plan view, form a linear weld portion connected to the weld portion and having a linear shape in the plan view, and form a fillet on a joined portion between the first member and the second member, the second member is arranged relative to the first member so that the second member is brought into contact with or brought close to the one main surface of the first member in only a linear region in the plan view, the second member is curved in the linear region, and at a time of irradiation with the laser beam, the linear weld portion is formed so that a whole of or a part of the linear weld portion extends beyond the linear region in the plan view.

9. The laser welding device according to claim 8, wherein an area in which a gap between a surface of the second member and the one main surface of the first member which the second member is brought into contact with or brought close to is equal to or smaller than ½ of a thickness of the first member is projected over the other main surface of the first member, the projected area is a given area that is irradiated with the laser beam.

10. The laser welding device according to claim 9, wherein at a time of irradiation with the laser beam, the laser beam is orbitally scanned around a given part having a center within the given area of the first member until reaching a circle having a diameter larger than a diameter of a spot of the laser beam.

11. The laser welding device according to claim 8, further comprising a filler metal feeder that supplies a filler metal, wherein in a case where a gap between an end face of the second member and the one main surface of the first member which the end face of the second member is brought close to is equal to or larger than ½ of a thickness of the first member, the end face of the second member is projected over the other main surface of the first member and the projected area is a given area that is irradiated with the laser beam, and at a time of irradiation with the laser beam, the laser beam is orbitally scanned around a given part having a center within the given area of the first member until reaching a circle having a diameter larger than a diameter of a spot of the laser beam, and the filler metal is supplied to an area irradiated with the laser beam.

12. The laser welding device according to claim 8, wherein a plurality of weld portions are formed by irradiation of the laser beam.

13. The laser welding device according to claim 12, wherein at the time of irradiation with the laser beam, after a plurality of weld portions are formed at a distance from each other, the linear weld portion is formed to connect the weld portions adjacent to each other.

14. The laser welding device according to claim 12, wherein at the time of irradiation with the laser beam, forming of weld portions at a distance from each other and forming of the linear weld portion to connect the weld portions adjacent to each other are performed one after another.

\* \* \* \* \*